US007194203B2

(12) United States Patent
Omiya et al.

(10) Patent No.: US 7,194,203 B2
(45) Date of Patent: Mar. 20, 2007

(54) LENS BARREL, PHOTOGRAPHIC APPARATUS, AND OPTICAL APPARATUS

(75) Inventors: Akio Omiya, Saitama (JP); Yoshihiro Ito, Asaka (JP); Takehiko Senba, Asaka (JP); Hiroshi Endo, Asaka (JP)

(73) Assignees: Fujinon Corporation, Saitama (JP); Fuji Photo Film Co., Ltd., Kanagawa (JP)

( * ) Notice: Subject to any disclaimer, the term of this patent is extended or adjusted under 35 U.S.C. 154(b) by 223 days.

(21) Appl. No.: 10/968,355

(22) Filed: Oct. 20, 2004

(65) Prior Publication Data

US 2005/0185950 A1 Aug. 25, 2005

(30) Foreign Application Priority Data

Feb. 23, 2004 (JP) ............................. 2004-046651
Sep. 24, 2004 (JP) ............................. 2004-278301

(51) Int. Cl.
*G03B 17/04* (2006.01)
*G02B 7/04* (2006.01)

(52) U.S. Cl. .................... 396/75; 396/349; 359/817

(58) Field of Classification Search ............... 396/73, 396/75, 349, 350; 359/676, 694, 696, 817, 359/821–823
See application file for complete search history.

(56) References Cited

U.S. PATENT DOCUMENTS 4,721,972 A * 1/1988 Wakabayashi .............. 396/349

6,944,396 B2 * 9/2005 Ito et al. ..................... 396/75

FOREIGN PATENT DOCUMENTS

JP   2003-295031 A   10/2003

OTHER PUBLICATIONS http://www.business-i.jp/sentan/jusyou/2003/pentax/, with 19 pages of English translation.

* cited by examiner

*Primary Examiner*—W. B. Perkey
*Assistant Examiner*—Rishi S. Suthar
(74) *Attorney, Agent, or Firm*—Sughrue Mion, PLLC

(57) ABSTRACT

A lens barrel has its collapsed length which can be further decreased and its extended length which can be further increased. A photographic apparatus incorporates the lens barrel into its body. A lens barrel is equipped with a first gear which is rotatably supported by a straight-ahead key ring and rotates being driven by rotation of a middle tube and a second gear which receives driving force from the first gear and retracts a second lens group to a predetermined retracted position off the optical axis of a zoom lens during collapse and advances the second lens group onto the optical axis during extension. The second gear lacks teeth in that part which faces the first gear when the second lens group is at the retracted position during collapse. Consequently, the first gear runs idle while facing that part thereby holding the second lens group at the retracted position.

18 Claims, 17 Drawing Sheets

LENS BARREL, PHOTOGRAPHIC APPARATUS, AND OPTICAL APPARATUS

BACKGROUND OF THE INVENTION

1. Field of the Invention

The present invention relates to a lens barrel which holds a zoom lens consisting of multiple lens groups, to a photographic apparatus which takes photographs by capturing light from a subject entering through the zoom lens held by the lens barrel, and to an optical apparatus which has a lens consisting of multiple lens groups.

2. Description of the Related Art

Recently, digital cameras have been spreading rapidly, and increasingly higher image quality is demanded together with smaller size and thinner profiles. A thin card-size digital camera equipped with a lens barrel which holds a zoom lens consisting of multiple lens groups has been proposed (see Non-patent Document 1: Internet URL—http://www.business-ijP/sentan/jusyou/2003/pentax/) and introduced commercially as one of digital cameras which meet the above needs. This camera is capable of high image quality zooming using optical zoom whereas earlier thin digital cameras use an electronic zoom function for magnification.

One of the trends in user needs is to have higher-powered optical zoom capabilities while achieving smaller size and thinner profiles.

Patent Document 1 (Japanese Patent Laid-Open No. 2003-295031) proposes a technique for collapsing a lens barrel equipped with a zoom lens in a thin camera body using an ingenious method for forming cam grooves.

An internal configuration of the lens barrel disclosed in Patent Document 1 is described below.

FIGS. 1, 2, and 3 are sectional views taken along the optical axis of the lens barrel mounted in a digital camera. Of these, FIGS. 1 and 2 show the lens as it is extended. According to Patent Document 1, FIG. 1 is a diagram showing a telephoto end while FIG. 2 is a diagram showing a wide-angle end. FIG. 3 is a diagram showing the lens barrel as it is collapsed. FIG. 4 is a developed view illustrating cam grooves used to extend and collapse the lens barrel from/into the camera body.

A configuration of a lens barrel 100 is described with reference to FIGS. 1 to 4.

The lens barrel 100 holds a four-group zoom lens composed of a first lens group 210, second lens group 220, third lens group 230, and fourth lens group 240. Of the four lens groups, the second lens group 220 is moved along the optical axis for adjustment of focal distance while the fourth lens group 240 serving as a focus lens is moved along the optical axis for focus adjustment.

The first lens group 210 is held in an inner tube 110. The inner tube 110 is equipped with cam pins 111, which are engaged with cam grooves 121 (see FIG. 4) formed in the inner surface of an outer tube 120. Three cam pins 111 are installed on the outer wall of the inner tube 110 at unequal intervals and three cam grooves 121 are formed on the inner wall of the outer tube 120 at unequal intervals (see FIG. 4) to engage with the cam pins 111. Consequently, when rotation of a zoom motor 270 is transmitted to a gear 124 installed on the inner wall of the outer tube 120 via a coupling gear 271 (see FIG. 2), rotating the outer tube 120, the first lens group 210 extends together with the inner tube 110 following the shape of the cam grooves 121.

The second lens group 220 is held by a lens group holding frame 221, on whose circumference three cam pins 222 are installed at unequal intervals. The cam pins 222 are engaged with respective cam grooves 122 formed in the inner wall of the outer tube 120 (see FIG. 4). A guide rod 1132 is passed through a through-hole 221a made in the lens group holding frame 221 of the second lens group 220. Along with rotation of the outer tube 120, the second lens group 220 moves along the optical axis, being guided by the guide rod 1132. The guide rod 1132 is supported by a tip support 1132a while a guide rod 1133 which guides the third lens group 230 is supported by another tip support 1133a. The tip supports 1132a and 1133a support the respective guide rods 1132 and 1133 and are also used as members which support the inner tube 110. The tip supports 1132a and 1133a are equipped with an intermediate frame 1101 and a retainer ring 1102. The intermediate frame 1101 is inserted slidably along the inner wall of the inner tube 110 and the retainer ring 1102 is installed at the rear end of the inner tube 110 to prevent the intermediate frame 1101 from moving backward. The intermediate frame 1101 and retainer ring 1102 are equipped with respective spring pegs 1101a and 1102b. A spring 1103 is bridged between the spring pegs to restrict the movement of the intermediate frame 1101 by urging the intermediate frame 1101 forward along the sliding surface so that the intermediate frame 1101 will not move backward when it is extended together with the inner tube 110.

Furthermore, a cam groove 123 (see FIG. 4) is formed between the cam grooves 121 and 122 in the outer tube 120 to engage with a cam pin (not shown) installed on a lens group holding frame 130 of the third lens group 230. Consequently, as the outer tube 120 rotates by receiving the driving force of the zoom motor 270 via the coupling gear 271 and gear 124 (see FIG. 2), the third lens group 230 moves along the optical axis following the shape of the cam groove 123. Incidentally, a shutter unit 131 is linked to the lens group holding frame 130 which holds the third lens group 230.

A through-hole 131a is made in the lens group holding frame 130 as in the case of the lens group holding frame 221. The guide rod 1132 is passed through the through-hole 131a. Furthermore, the guide rod 1132 is also passed through a through-hole 141a made in a lens group holding frame 140 which holds the fourth lens group 240 described later. In this way, this example employs a configuration in which the second lens group 220, third lens group 230, and fourth lens group 240 are guided by the common guide rod 1132 to avoid misalignment of optical axes.

Extension operation of the lens barrel 100 with this configuration is described in detail with reference to FIG. 4.

When the outer tube 120 is rotated by the zoom motor 270, the inner tube 110 extends from a collapsed state to an extended position (B-side end of the area indicated by symbol A) following the shape of the cam grooves 121 (area indicated by symbol A) and held at the extended position (area indicated by symbol B). Until the outer tube 120 is held at the extended position, the second lens group 220 moves along the area indicated by symbol C following the shape of the cam grooves 122 and reaches the end of the area indicated by symbol C when the inner tube 110 is extended to the extended position. As a zoom switch (not shown) is operated at this time, the second lens group 220 enters the area indicated by symbol D, and moves to the end of the area indicated by symbol D if the zoom switch continues to be operated. On the other hand, as the inner tube 110 rotates, the third lens group 230 leaves a collapsed position, moves along the cam groove 123 through an extension area (area indicated by symbol E) and reaches an extended position (intersection of areas indicated by symbols E and F). It remains held at the extended position (area indicated by symbol F) even if the zoom switch is operated.

In this way, by arranging cam grooves ingeniously in the inner wall of the outer tube 120, it is possible to move the first lens group, second lens group 220, and third lens group 230 among the four lens groups along the optical axis following the shape of the cam grooves by the rotation of the single tube 120 and move the second lens group along the optical axis by the operation of the zoom switch, and thereby do zooming.

In the lens barrel 100 shown in FIGS. 1 to 3, the fourth lens group 240 at the tail of the four lens groups composing the zoom lens is used as a focus lens. The zoom lens held in the lens barrel 100 has a high zoom ratio, and consequently the fourth lens group 240 acting as the focus lens must have a relatively long travel distance. Thus, in this example, a column screw 1131 (see FIG. 1) as long as the long travel distance is installed along the optical axis, a nut 141b is fastened to the lens group holding frame 140 which holds the fourth lens group 240, and the column screw 1131 is screwed into the nut 141b for accurate focus adjustment.

Focus is adjusted as the column screw 1131 is rotated by rotational driving force of a focus motor (not shown) transmitted via a gear train (not shown) and a lens group holding frame 141 moves along the optical axis by the distance equivalent to the rotation of the column screw 1131, being guided by the column screw 1131 and guide rods 1132 and 1133. When an image taking lens starts to catch a subject, focus is adjusted by generating image data by means of an image pickup device 280, detecting a focus position based on the image data, and moving the fourth lens group 240 acting as the focus lens to the focus position through rotation of the column screw.

After focus adjustment, when a shutter button (not shown) is pressed, the shutter unit 131 provided in the lens group holding frame 130 which holds the third lens group 230 is operated in, synchronization with full depression of the shutter button to take a photograph. Consequently, light from the subject passes through the first lens group 210, second lens group 220, third lens group 230, and fourth lens group 240 (focus lens) and forms an image on a light-receiving surface of the image pickup device 280, which generates an image signal which represents the subject image formed on the light-receiving surface.

Even if attempts are made to further reduce the length of the lens barrel, since the lens barrel shown in FIGS. 1 to 4 consists of two tubes, it is not possible to reduce the length sufficiently. It is conceivable to reduce the length of the lens barrel by increasing the number of tubes of the lens barrel to three or four. In that case, however, to arrange lens groups of the collapsed lens barrel along the optical axis, it is necessary to build a safety factor into the length of the lens barrel to allow adjacent lens groups to stay clear of each other. Besides, for high-powered zooming, it is also necessary to increase the length of the extended lens barrel to allow for a longer adjustable distance between lens groups composing the zoom lens.

Thus, due to the increase in the length of the extended lens barrel, the length of the collapsed lens barrel cannot be decreased as it ought to be.

SUMMARY OF THE INVENTION

The present invention has been made in view of the above circumstances and provides a lens barrel whose collapsed length can be further decreased and whose extended length can be further increased, a photographic apparatus which incorporates the lens barrel into its body, and an optical apparatus which has a lens extendable to a great extent.

A lens barrel according to the present invention is extendable and collapsible and holds a zoom lens consisting of multiple lens groups, the lens barrel having:

a rotating tube which rotates by a driving force and extends and collapses the zoom lens;

a first gear which rotates, being driven by the rotation of the rotating tube; and a second gear which, being driven by the first gear with which the second gear meshes, retracts a predetermined first lens group among the multiple lens groups to a predetermined retracted position off the optical axis of the zoom lens during collapse and advances the predetermined first lens group onto the optical axis during extension, wherein the second gear lacks teeth in that part which faces the first gear when the first lens group is at the retracted position during collapse.

This invention makes it possible to decrease the length of the collapsed lens barrel by retracting the first lens group to a predetermined retracted position.

If the second gear lacks teeth in that part which faces the first gear when the first lens group is at the retracted position during collapse, the first gear does not mesh with the second gear when the first lens group is retracted, and thus the first lens group is held and housed in the retracted position. If, for example, the first lens group is spring-loaded constantly toward the optical axis, the rotation of a middle tube urges the second gear toward the first gear during extension, bringing it into mesh with the first gear, and thereby causing the first lens group to advance onto the optical axis. Thus, a combination of gear mesh and spring loading makes it possible to advance the first lens group accurately onto the optical axis and retract it from the optical axis. This makes it possible to implement a lens barrel whose collapsed length is decreased and whose extended length is increased.

Preferably, the second gear unmeshes from the first gear in at least part of a zoom range by being extended ahead of the first gear; and the first gear lacks teeth in that part which faces the second gear reaching a meshing position from ahead in the process of zooming or in the process of collapse.

If the second gear unmeshes from the first gear in at least part of a zoom range by being extended ahead of the first gear, since the first gear and second gear do not mesh with each other, smooth zooming is done without being restricted by the gears. Also, if the first gear lacks teeth in that part which faces the second gear reaching a meshing position from ahead in the process of zooming or in the process of collapse, the two gears mesh with each other smoothly without interfering with each other when reaching the meshing position from ahead in the process of zooming or in the process of collapse. This makes it possible to retract the first lens group to the retracted position quickly in the subsequent process of collapse.

Preferably, the lens barrel has:

a fixed tube and a straight-ahead key member advanceably/retractably engaged with the fixed tube;

wherein the rotating tube is a middle tube which rotatably engages with the straight-ahead key member and advances/retracts along with rotation due to cam engagement with the fixed tube, the lens barrel further has a front tube which advanceably/retractably engages with the straight-ahead key member and advances/retracts along with rotation due to cam engagement with the middle tube, and the first gear is rotatably supported by the straight-ahead key member and rotates being driven by rotation of the middle tube.

In this way, when the middle tube which is the rotating tube advances/retracts along the optical axis along with rotation, the front tube advances/retracts along the optical axis, and the first gear is driven to rotate. That is, by using the middle tube as a driving tube, it is possible to simplify the lens barrel and further reduce its size.

The zoom lens may consist of four lens groups; and the first gear may retract a second lens group to a predetermined retracted position off the optical axis of the zoom lens during collapse and advance the second lens group onto the optical axis during extension, or the first gear may retract a fourth lens group to a predetermined retracted position off the optical axis of the zoom lens during collapse and advance the fourth lens group onto the optical axis during extension.

This makes it possible to decrease the length of the lens barrel.

The present invention provides a photographic apparatus which takes photographs by capturing light from a subject entering through a zoom lens consisting of multiple lens groups and held by an extendable/collapsible lens barrel, wherein:

the lens barrel has:

a rotating tube which rotates by a driving force and extends and collapses the zoom-lens, a first gear which rotates, being driven by the rotation of the rotating tube, and a second gear which, being driven by the first gear with which the second gear meshes, retracts a predetermined first lens group among the multiple lens groups to a predetermined retracted position off the optical axis of the zoom lens during collapse and advances the predetermined first lens group onto the optical axis during extension, and the second gear lacks teeth in that part which faces the first gear when the first lens group is at the retracted position during collapse.

Preferably, in the photographic apparatus:

the second gear unmeshes from the first gear in at least part of a zoom range by being extended ahead of the first gear; and the first gear lacks teeth in that part which faces the second gear reaching a meshing position from ahead in the process of zooming or in the process of collapse. Also preferably, the photographic apparatus has an image pickup device which generates image signals by capturing light from a subject entering through the zoom lens held by the lens barrel.

A lens barrel according to the present invention may hold an image taking lens consisting of a plurality of lens groups and may be capable of changing a barrel length thereof between a housed state of relatively short length and a photographing state of relatively long length, the lens barrel having:

a rotating tube which rotates by a driving force so as to change the lens barrel between the photographing state and the housed state;

a first gear which rotates, being driven by the rotation of the rotating tube; and a second gear which, being driven by the first gear with which the second gear meshes, retracts a predetermined first lens group among the plurality of lens groups to a predetermined retracted position off the optical axis of the image taking lens during transition to the housed state and advances the predetermined first lens group onto the optical axis during extension, wherein the second gear lacks teeth in that part which faces the first gear when the first lens group retracted during transition to the housed state is at the retracted position.

In this lens barrel, preferably:

the second gear unmeshes from the first gear in at least part of a zoom range by being extended ahead of the first gear; and the first gear lacks teeth in that part which faces the second gear reaching a meshing position from ahead in the process of zooming or in the process of transition to the housed state.

Further, in this case, the lens barrel may have:

a fixed tube and a straight-ahead key member advanceably/retractably engaged with the fixed tube;

wherein the rotating tube may be a middle tube which rotatably engages with the straight-ahead key member and advances/retracts along with rotation due to cam engagement with the fixed tube, the lens barrel further may have a front tube which advanceably/retractably engages with the straight-ahead key member and advances/retracts along with rotation due to cam engagement with the middle tube, and the first gear may be rotatably supported by the straight-ahead key member and rotate being driven by rotation of the middle tube.

Furthermore, in this lens barrel, preferably: the image taking lens consists of four lens groups; and the first gear retracts a second lens group to a predetermined retracted position off the optical axis of the image taking lens during transition to the housed state and advances the second lens group onto the optical axis during transition to the photographing state. Alternatively, in this lens barrel, preferably: the image taking lens consists of four lens groups; and the first gear retracts a fourth lens group to a predetermined retracted position off the optical axis of the image taking lens during transition to the housed state and advances the fourth lens group onto the optical axis during transition to the photographing state.

An optical apparatus according to the present invention may hold a lens consisting of a plurality of lens groups and may be capable of changing a barrel length thereof between a first state of relatively short length and a second state of relatively long length, wherein:

the lens barrel may have:

a rotating tube which rotates by a driving force so as to change the lens barrel between the first state and the second state, a first gear which rotates, being driven by the rotation of the rotating tube, and a second gear which, being driven by the first gear with which the second gear meshes, retracts a predetermined first lens group among the plurality of lens groups to a predetermined retracted position off the optical axis of the lens during transition to the first state and advances the predetermined first lens group onto the optical axis during extension, and the second gear may lack teeth in that part which faces the first gear when the first lens group retracted during transition to the first state is at the retracted position.

In this optical apparatus, preferably:

the second gear unmeshes from the first gear in at least part of a zoom range by being extended ahead of the first gear; and the first gear lacks teeth in that part which faces the second gear reaching a meshing position from ahead in the process of zooming or in the process of transition to the first state.

Further, this optical apparatus preferably has:

a fixed tube and a straight-ahead key member advanceably/retractably engaged with the fixed tube;

wherein the rotating tube may be a middle tube which rotatably engages with the straight-ahead key member and advances/retracts along with rotation due to cam engagement with the fixed tube, the lens barrel further may have a front tube which advanceably/retractably engages with the straight-ahead key member and advances/retracts along with rotation due to cam engagement with the middle tube, and the first gear may be rotatably supported by the straight-ahead key member and rotate being driven by rotation of the middle tube.

Furthermore, in this optical apparatus, preferably: the lens consists of four lens groups; and the first gear retracts a second lens group to a predetermined retracted position off the optical axis of the lens during transition to the first state and advances the second lens group onto the optical axis during transition to the second state. Alternatively, in this optical apparatus, preferably: the lens consists of four lens groups; and the first gear retracts a fourth lens group to a predetermined retracted position off the optical axis of the lens during transition to the first state and advances the fourth lens group onto the optical axis during transition to the second state.

As described above, the present invention implements a lens barrel whose collapsed length (length at a housed state or a first state) can be decreased and whose extended length (length at a photographing state or a second state) can be increased, a photographic apparatus which incorporates the lens barrel into its body, as well as an optical apparatus which has a lens extendable to a great extent.

DETAILED DESCRIPTION OF THE INVENTION

Embodiments of the present invention are described below.

Figure 1:
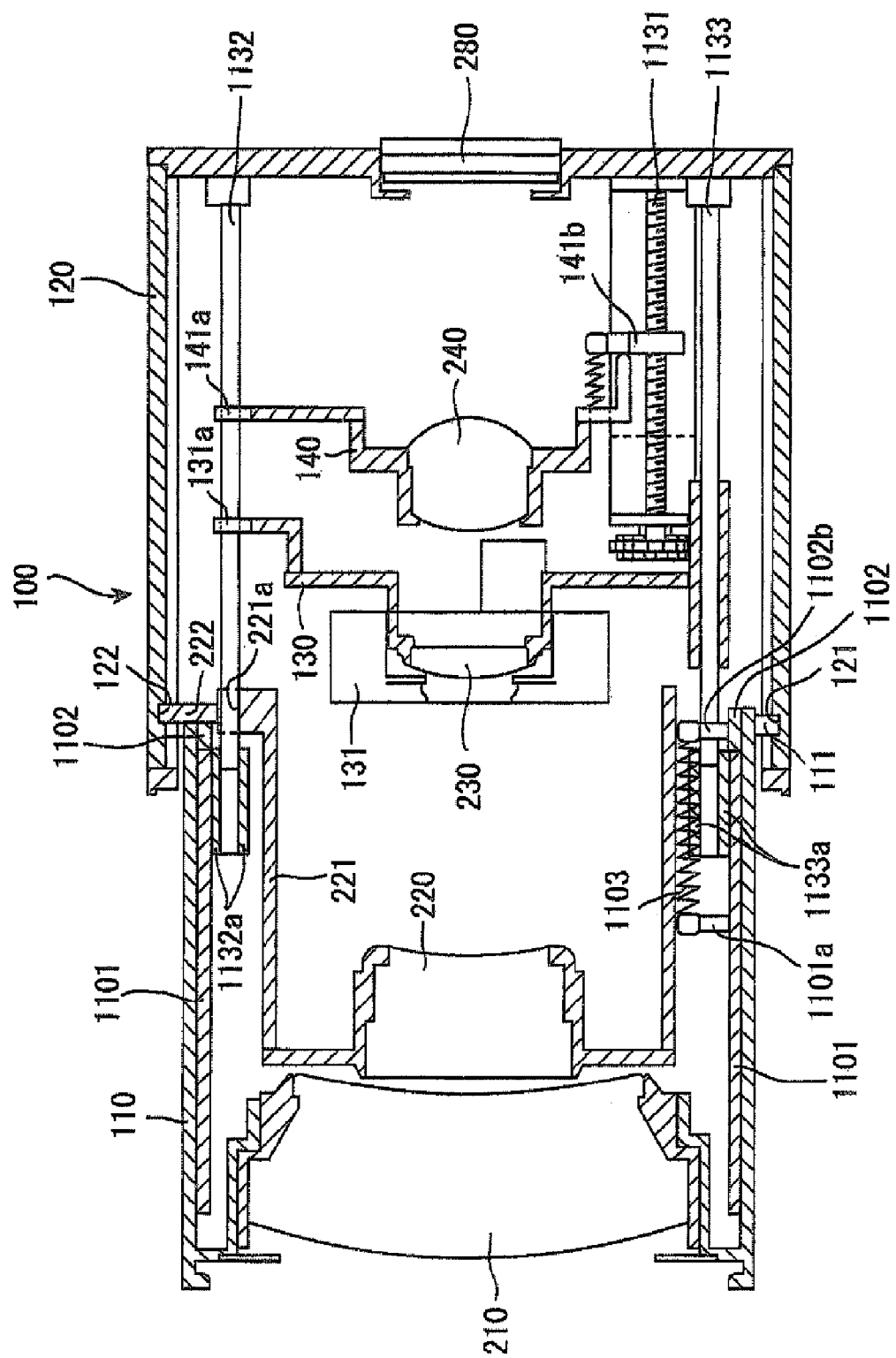
FIG. 1 is a sectional view taken along the optical axis of a lens barrel mounted in a conventional digital camera, where the lens barrel is at a wide-angle end.
Figure 2:
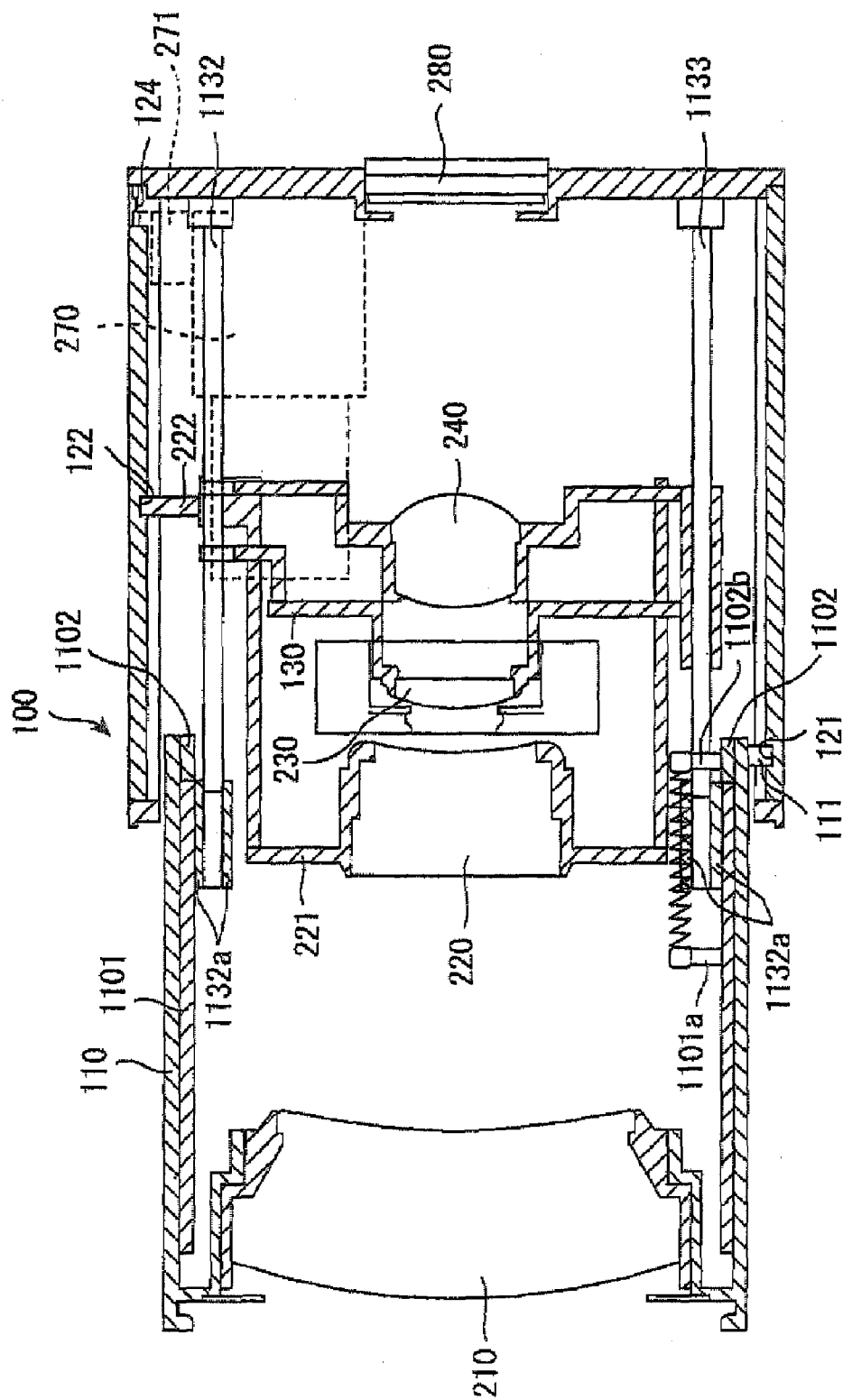
FIG. 2 is a sectional view taken along the optical axis of the lens barrel mounted in the conventional digital camera, where the lens barrel is at a telephoto end.
Figure 3:
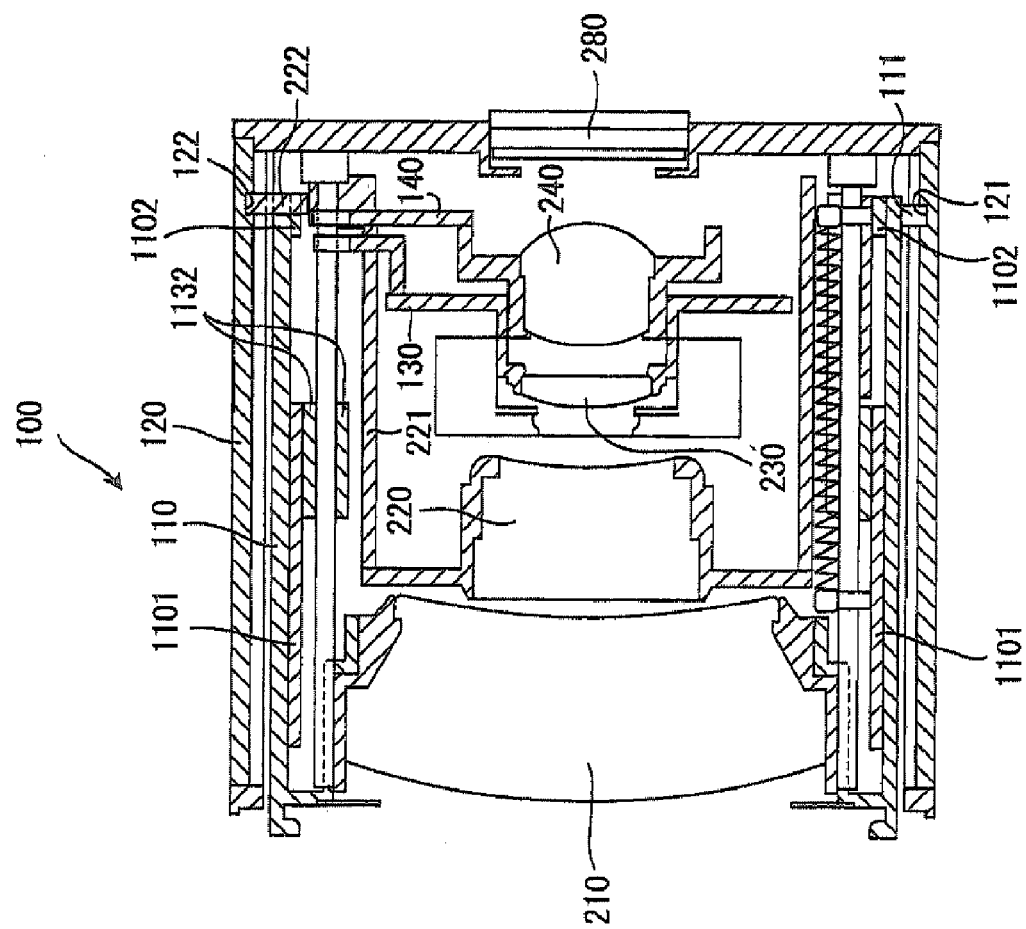
FIG. 3 is a sectional view taken along the optical axis of the lens barrel mounted in the conventional digital camera, where the lens barrel is collapsed.
Figure 4:
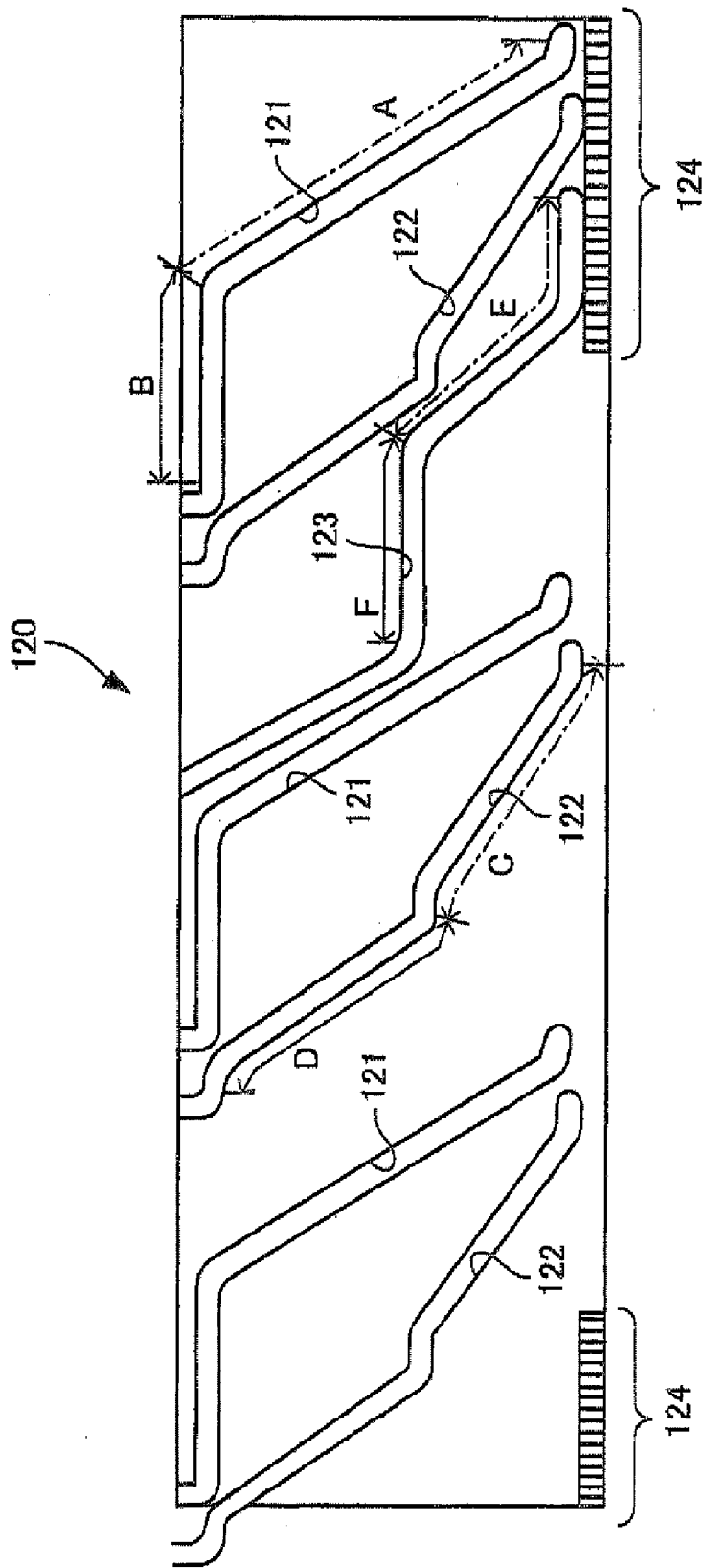
FIG. 4 is a developed view illustrating cam grooves formed in the inner wall of an outer tube 120 and used to extend an inner tube 110 as well as to adjust focus by adjusting distance between a second lens group 220 and third lens group 230.
Figure 5:
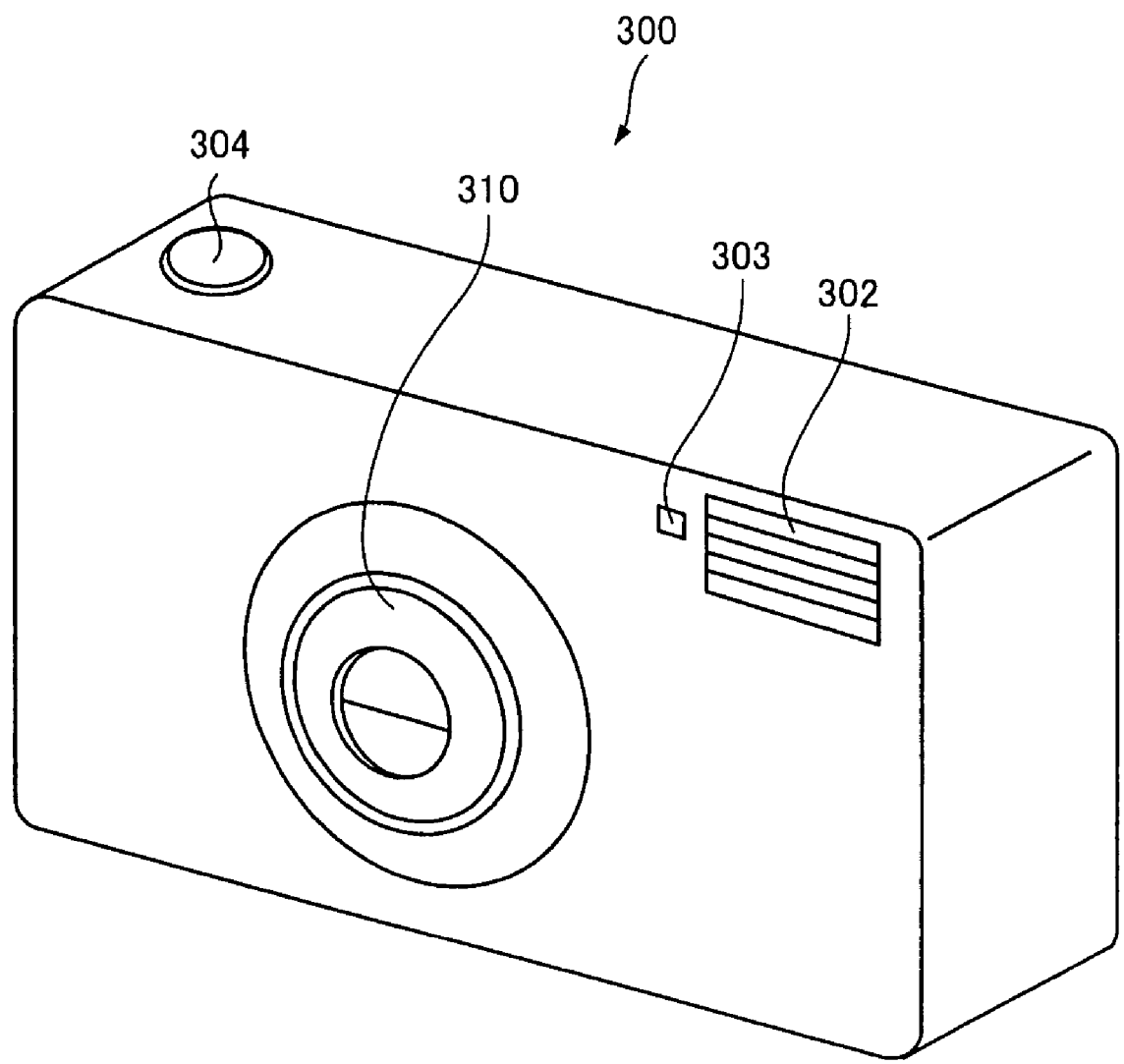
FIG. 5 is an external perspective view of a digital camera 300 which is an embodiment of a photographic apparatus according to the present invention and which incorporates an embodiment of a lens barrel according to the present invention into its body.
Figure 6:
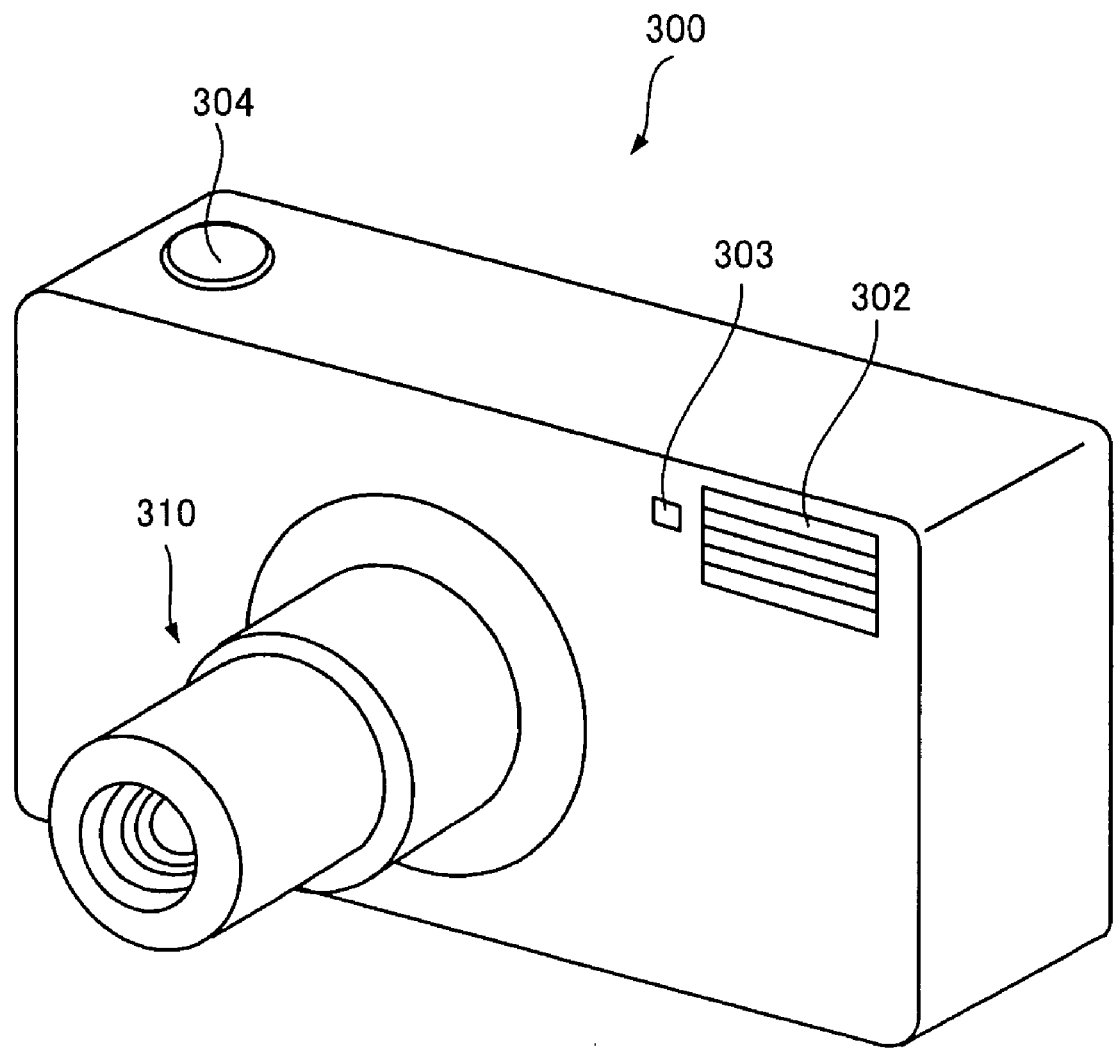
FIG. 6 is a diagram showing the digital camera in FIG. 5 with the lens barrel extended.

FIGS. 5 and 6 are external perspective views of a digital camera 300 which is an embodiment of a photographic apparatus according to the present invention and which incorporates an embodiment of a lens barrel according to the present invention into its body.

FIG. 5 is an external view in the case where a lens barrel 310 incorporated into the body of the digital camera 300 is in a collapsed state while FIG. 6 is an external view in the case where the lens barrel 310 is in an extended state.

The lens barrel 310 of the digital camera 300 shown in FIGS. 5 and 6 incorporates an image taking lens consisting of four lens groups. The second of the four lens groups is moved along the optical axis for adjustment of focal distance while the fourth lens group serving as a focus lens is moved along the optical axis for focus adjustment.

On the upper front part of the digital camera 300 shown FIGS. 5 and 6, there are a fill flash window 302 and finder objective window 303. On the top face, there is a shutter button 304.

A zoom control switch is mounted on the back (not shown) of the digital camera 300. While one end of the zoom control switch is depressed, the lens barrel 310 extends to the telephoto side. While the other end of the zoom control switch is depressed, the lens barrel 310 moves to the wide-angle side.

Figure 7:
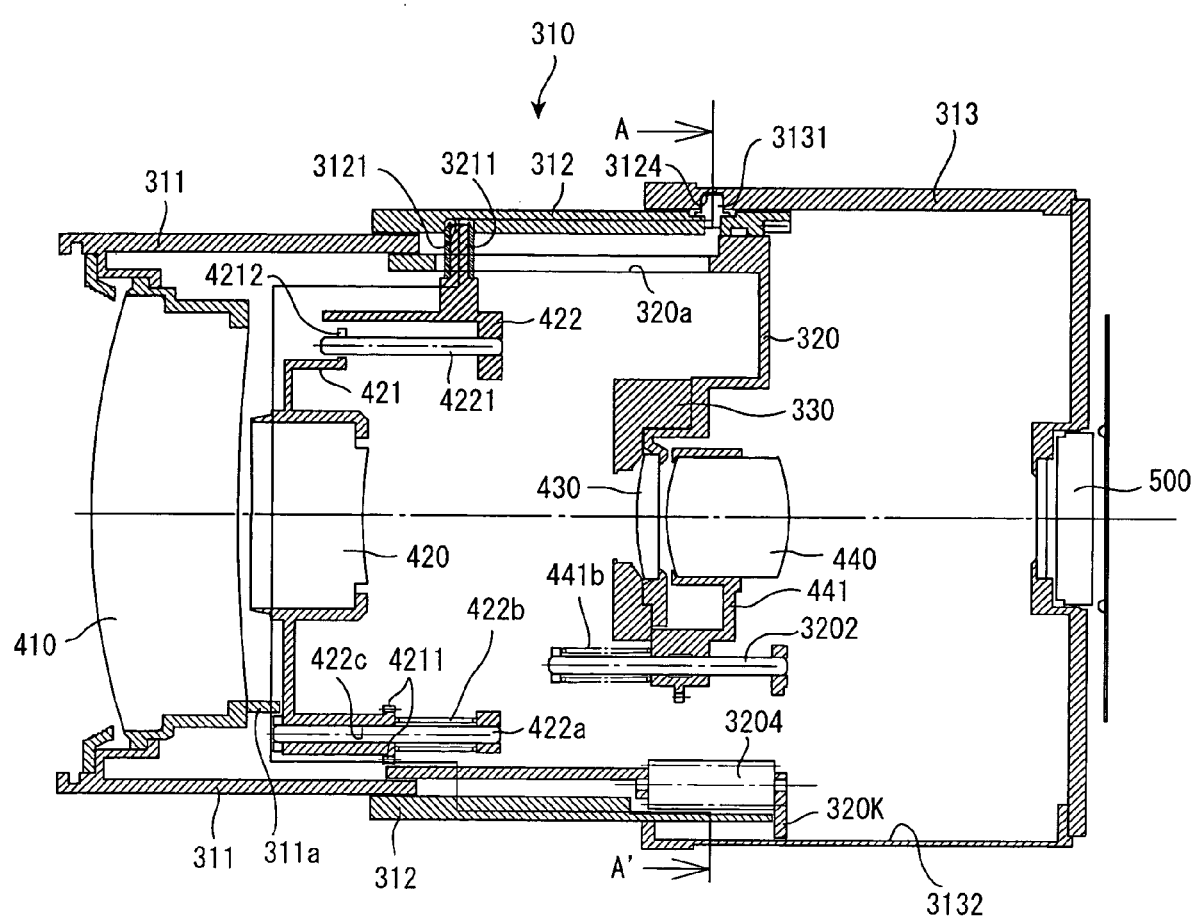
FIG. 7 is a sectional view along the optical axis of the lens barrel 310 incorporated into the digital camera in FIGS. 5 and 6 with the lens barrel at the wide-angle end.
Figure 8:
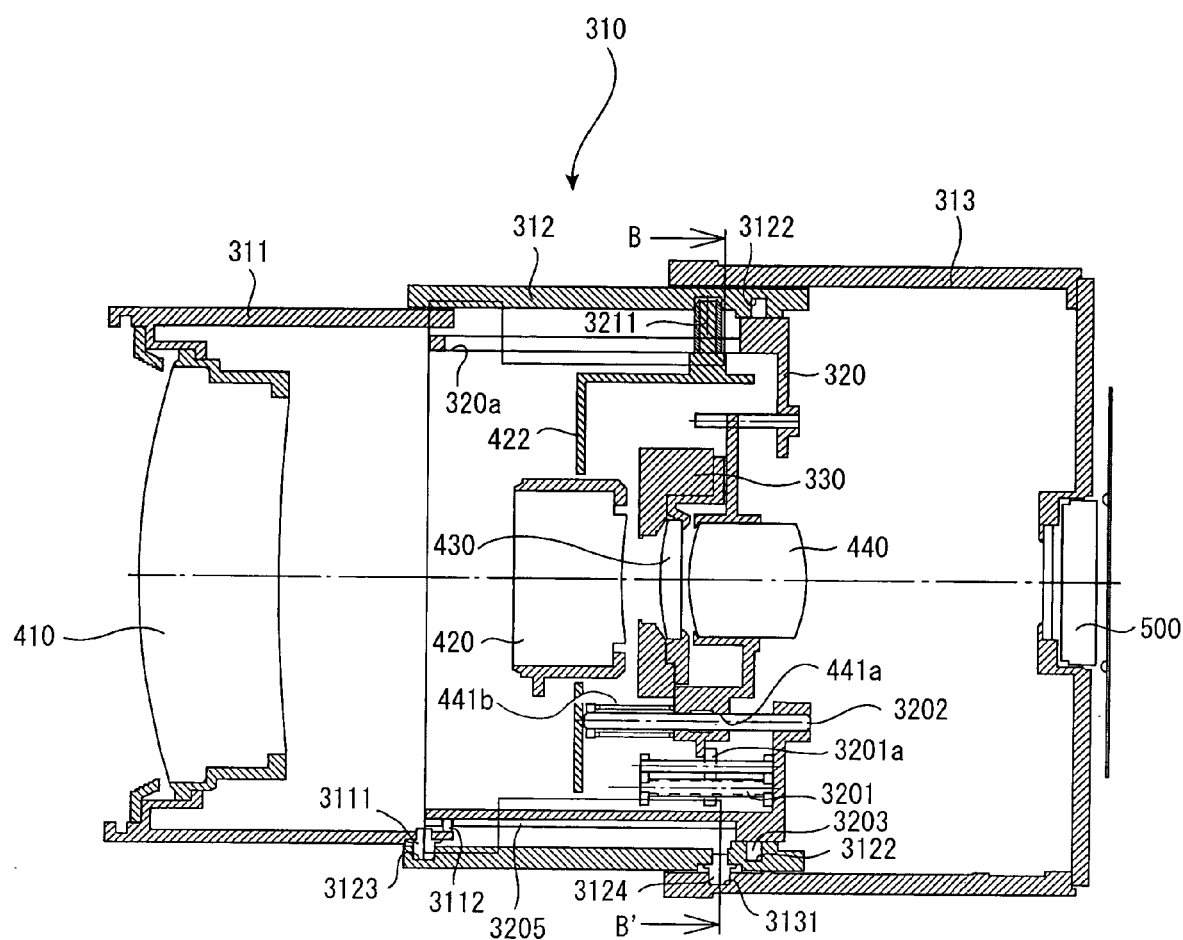
FIG. 8 is a sectional view along the optical axis of the lens barrel 310 incorporated into the digital camera in FIGS. 5 and 6 with the lens barrel at the telephoto end.
Figure 9:
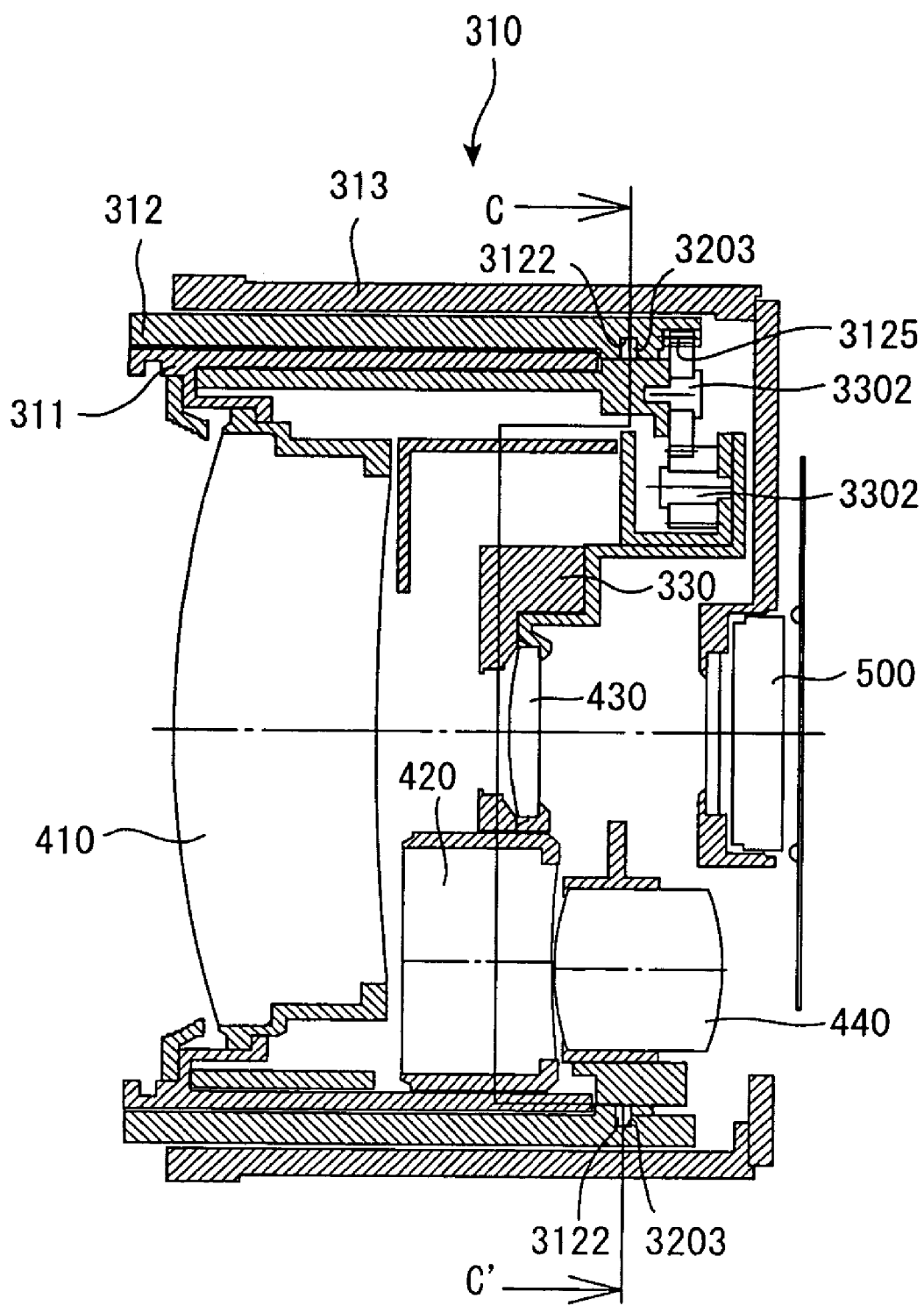
FIG. 9 is a sectional view along the optical axis of the lens barrel 310 incorporated into the digital camera in FIGS. 5 and 6 with the lens barrel collapsed.
Figure 10:
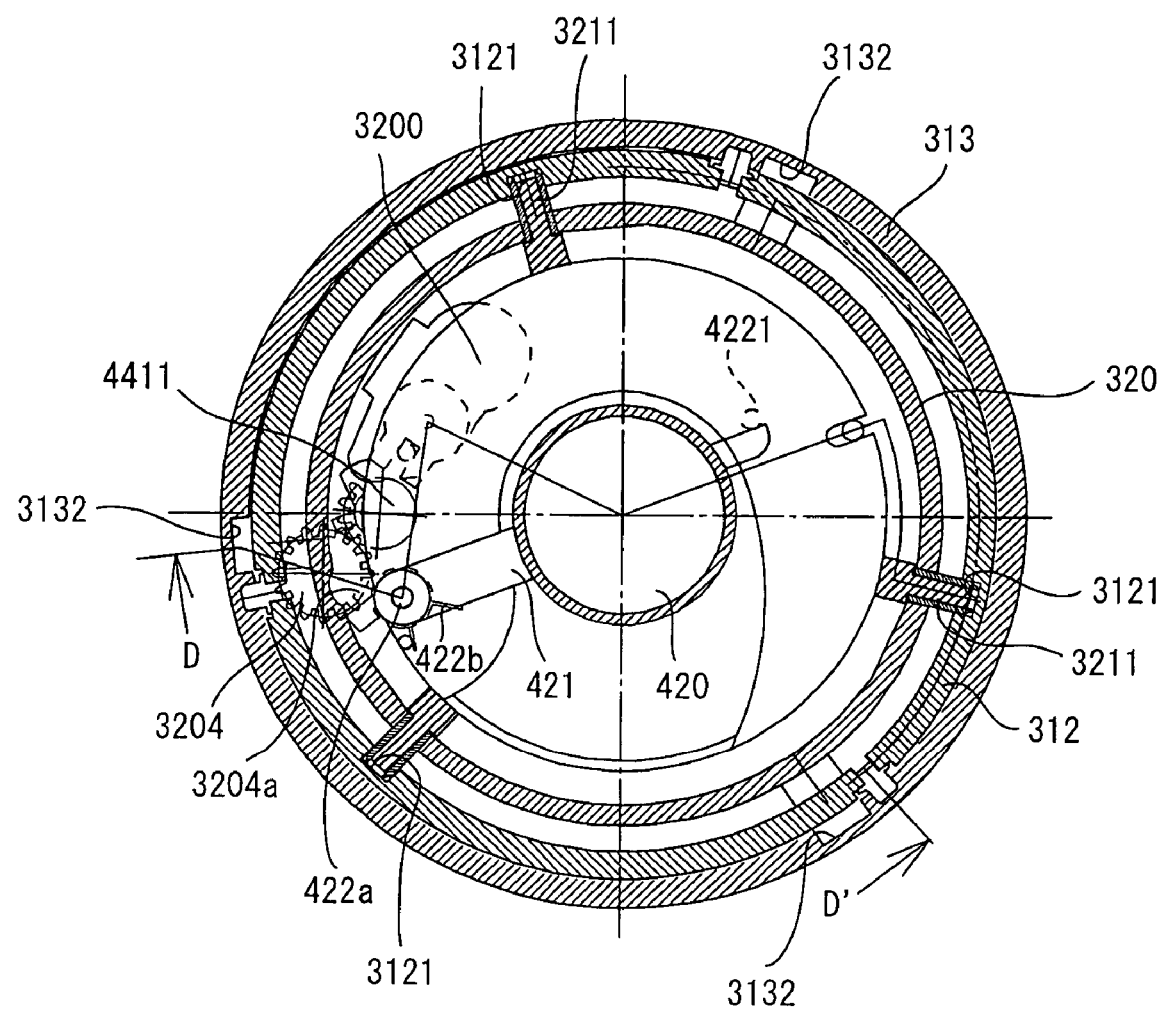
FIG. 10 is a sectional view of the lens barrel sliced along the line and viewed in the direction of the arrows in FIG. 7.
Figure 11:
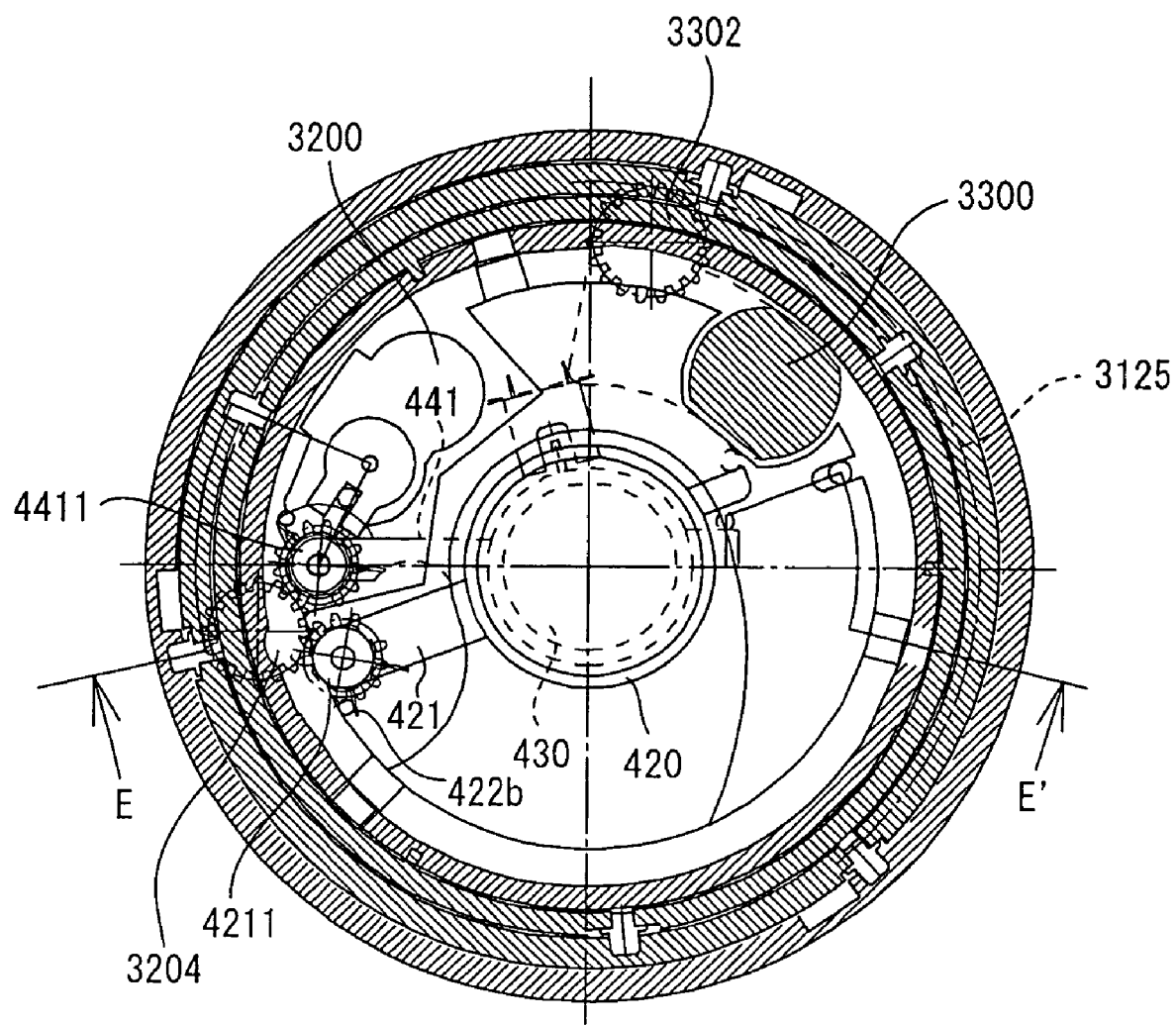
FIG. 11 is a sectional view of the lens barrel sliced along the line and viewed in the direction of the arrows in FIG. 8.
Figure 12:
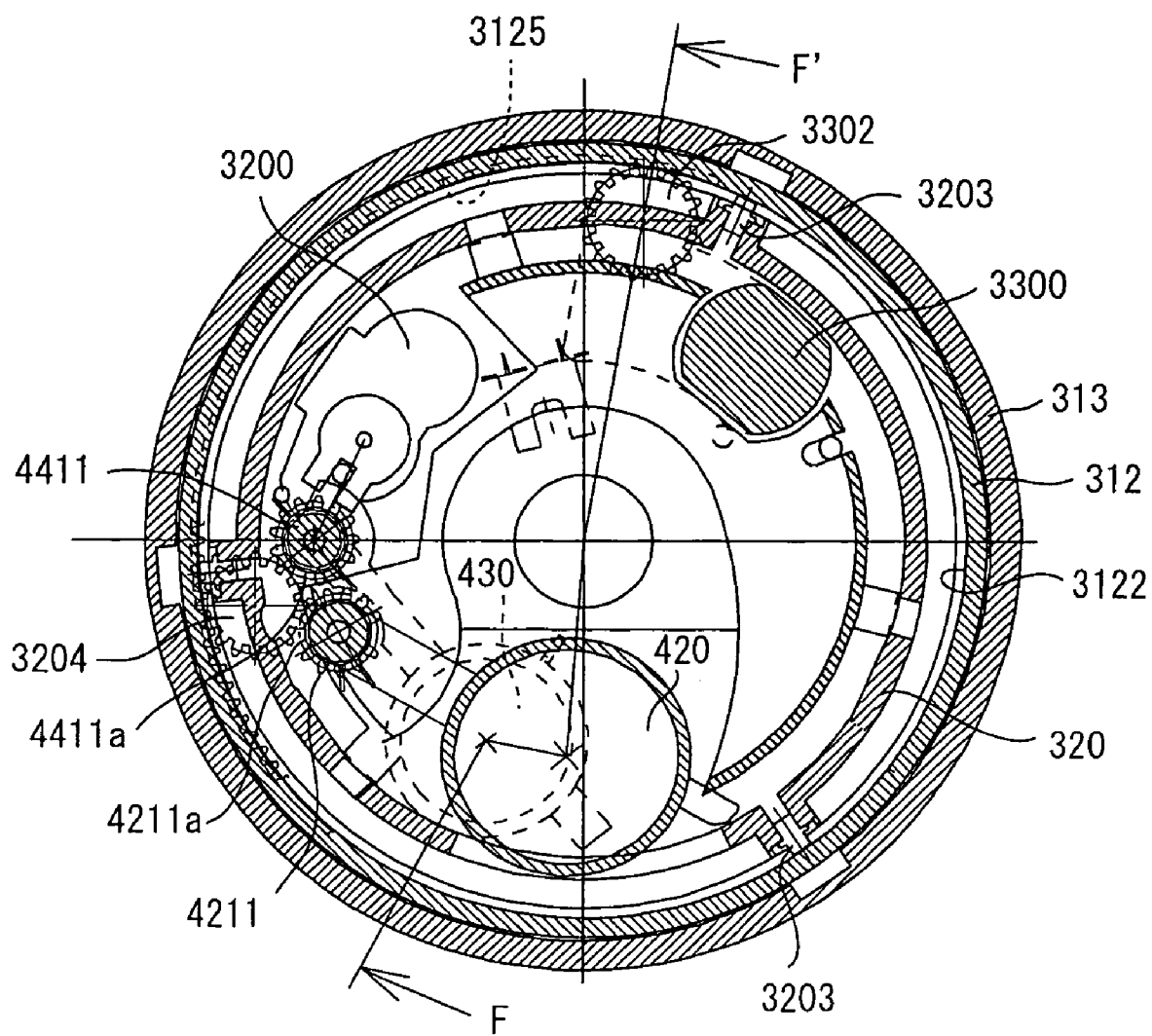
FIG. 12 is a sectional view of the lens barrel sliced along the line and viewed in the direction of the arrows in FIG. 9.
Figure 13:
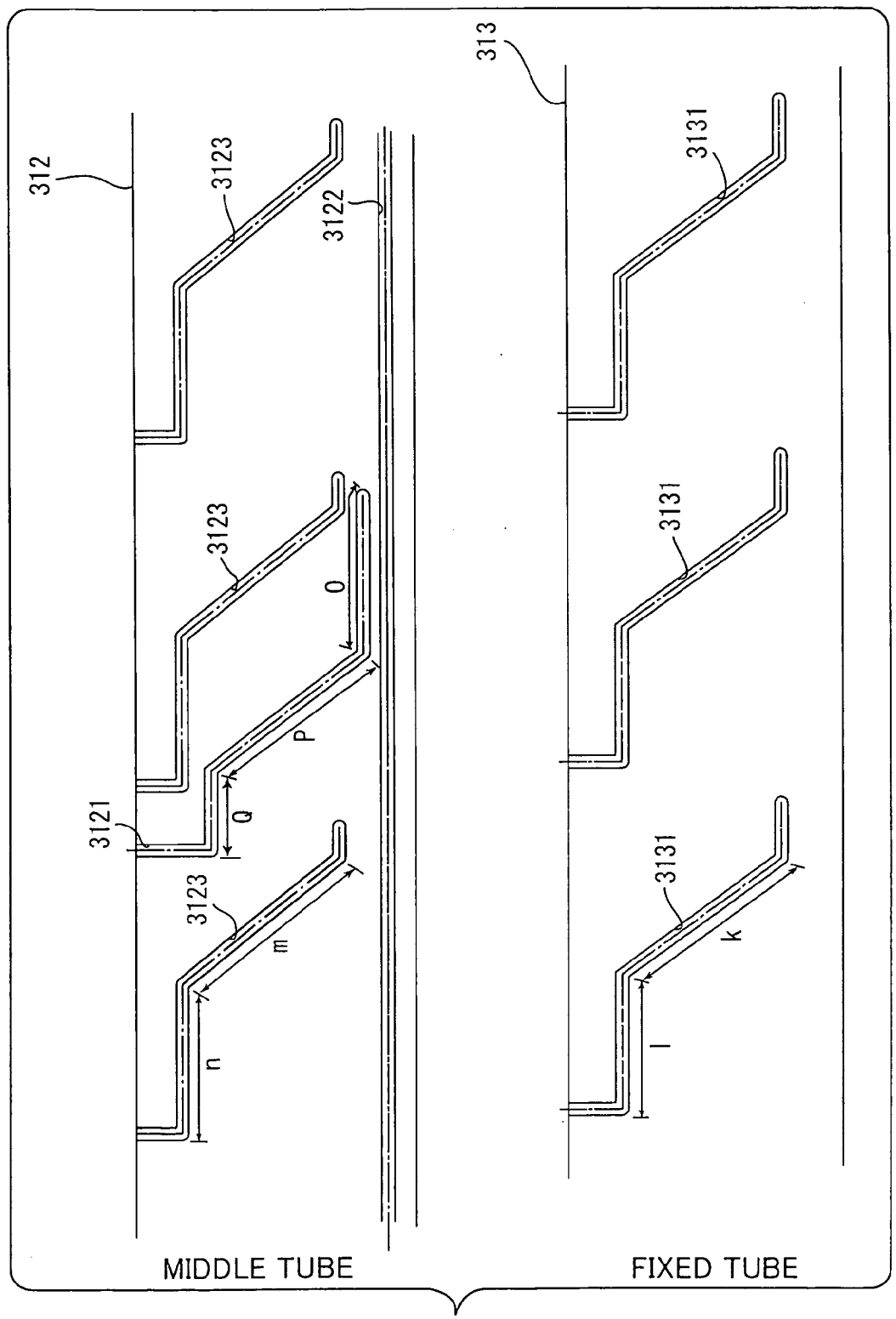
FIG. 13 is a developed view illustrating cam grooves formed in the inner wall of a middle tube.
Figure 14:
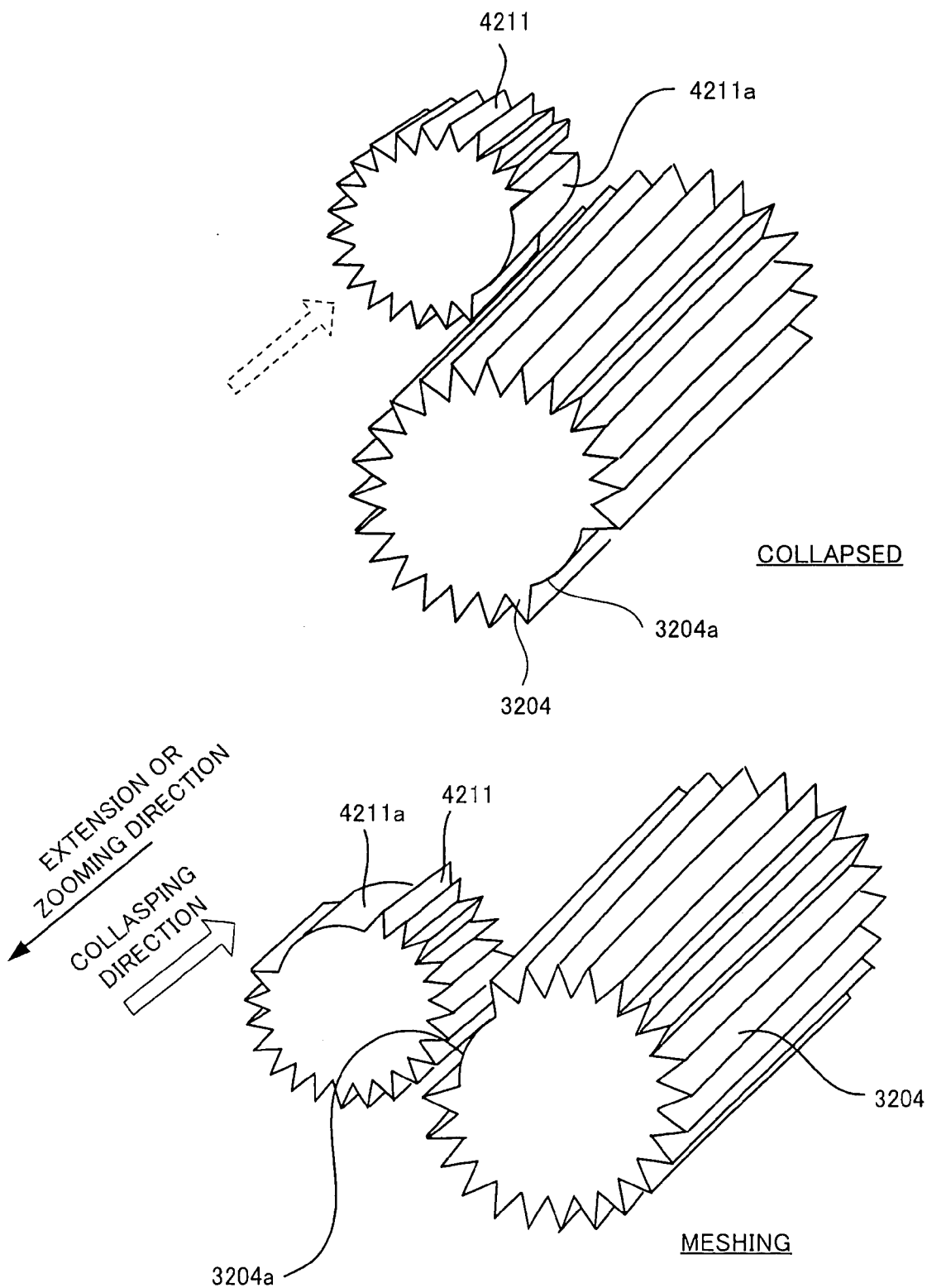
FIG. 14 is a diagram showing shapes of a first gear and second gear.

FIGS. 7, 8, and 9 are sectional views taken along the optical axis of the lens barrel 310 incorporated into the digital camera in FIGS. 5 and 6. FIGS. 7, 8, and 9 show a wide-angle end, telephoto end, and collapsed state, respectively. FIG. 10 is a sectional view of the lens barrel in FIG. 7 sliced along line A–A' and viewed in the direction of the arrows in FIG. 7, FIG. 11 is a sectional view of the lens barrel in FIG. 8 sliced along line B–B' and viewed in the direction of the arrows in FIG. 8, FIG. 12 is a sectional view of the lens barrel in FIG. 9 sliced along line C–C' and viewed in the direction of the arrows in FIG. 9. FIG. 7 is a sectional view of the lens barrel sliced along line D–D' and viewed in the direction of the arrows in FIG. 10, FIG. 8 is a sectional view of the lens barrel sliced along line E–E' and viewed in the direction of the arrows in FIG. 11, FIG. 9 is a sectional view of the lens barrel sliced along line F–F' and viewed in the direction of the arrows in FIG. 12. FIG. 13 is a developed view illustrating cam grooves formed in the inner walls of the outermost and middle tubes of the three tubes which compose the lens barrel shown in FIGS. 7 to 12. Hereinafter, the outermost tube of the three tubes is referred to as a fixed tube 313, the middle tube of the three tubes is referred to as a middle tube 312, and the innermost tube is referred to as a front tube 311. FIG. 14 is a diagram showing shapes of the first gear and second gear according to the present invention.

The lens barrel 310 incorporates a four-group zoom lens composed of a first lens group 410, second lens group 420, third lens group 430, and fourth lens group 440. The fourth lens group 440 at the tail of the four-group zoom lens is used as a focus lens.

As shown in FIGS. 7, 8, and 9, the first lens group 410 is held in the front tube 311. The front tube 311 is equipped with cam pins 3111 (see FIG. 8), which are engaged with cam grooves 3123 (see FIGS. 8 and 13) formed in the inner wall of the middle tube 312. The middle tube 312 is also equipped with cam pins 3124, which are engaged with cam grooves 3131 (see FIG. 13) formed in the inner wall of the fixed tube 313. A straight-ahead key ring 320 has a straight-ahead groove 3205 into which a protrusion 3112 of the front tube 311 is fitted. The fit (see FIG. 8) between the protrusion 3112 and straight-ahead groove 3205 serves to stop the rotation of the front tube 311. Thus, the front tube 311 and straight-ahead key ring 320 are only capable of relative travel along the optical axis, and do not rotate around the optical axis.

The middle tube 312 is configured to rotate by means of a zoom motor 3300 (see FIGS. 11 and 12). When the middle tube 312 rotates being driven by the zoom motor 3300, it moves along the optical axis following the shape of the cam grooves 3131 in the inner surface of the fixed tube 313 and the front tube 311 moves along the optical axis following the shape of the cam grooves 3123 in cam engagement with the rotating and moving middle tube 312. FIGS. 11 and 12 show coupling between the zoom motor 3300 and middle tube 312, where the zoom motor 3300 torques a gear 3125 on the inner wall of the middle tube 312 via a coupling gear 3302 (see FIG. 9), causing the middle tube 312 to rotate.

A straight-ahead key 320K installed on the straight-ahead key ring 320 is advanceably/retractably engaged with a straight-ahead groove 3132 in the fixed tube 313. Furthermore, the middle tube 312 is rotatably engaged with the straight-ahead key ring 320 as cam pins 3203 installed on the straight-ahead key ring 320 are engaged with cam grooves 3122 (see FIGS. 8 and 12) formed in the middle tube 312. Thus, as the middle tube 312 advances/retracts along with rotation due to cam engagement with the fixed tube 313, the straight-ahead key ring 320 also advances/retracts along with the middle tube 312.

In this way, the middle tube 312 is capable of relative travel around the optical axis and capable of traveling along the optical axis integrally with the straight-ahead key ring 320.

Of the lens group holding frames which hold the lens groups, relationship among a lens group holding frame 421 which holds the second lens group 420, a lens group holding frame 441 which holds the fourth lens group 440, and the middle tube 312, relationship between the straight-ahead key ring 320 and third lens group 430, and relationship between the middle tube 312 and fixed tube 313 are described with reference to FIGS. 7 to 13. In this embodiment, to further reduce the length of the lens barrel, not only the second lens group (the first lens group according to the present invention) is retracted to the retracted position, but also another lens group, namely the fourth lens group 440, is retracted to the retracted position by a retraction mechanism. Such retraction mechanisms are described as required in the process of describing relationships among lens groups.

The lens group holding frame 421 which holds the second lens group 420 is supported movably by a lens group supporting frame 422 whose outer wall has cam pins 3211. The cam pins 3211 penetrate a key way 320a of the straight-ahead key ring 320 and engages with cam grooves 3121 (see FIGS. 7 and 10) formed in the inner wall of the middle tube 312. Also, as shown in FIGS. 7 to 12, the straight-ahead key ring 320 supports the second lens group 420 via the lens group supporting frame 422 with the second lens group 420 being held by the second lens group holding frame. It also supports the third lens group 430. Furthermore, it supports the fourth lens group 440 via a travel mechanism equipped with a column screw 3201 (see FIG. 8).

As described above, the lens group supporting frame 422 engaged with the straight-ahead key ring 320 has the cam pins 3211. As described above, the cam pins 3211 penetrate the key way 320a of the straight-ahead key ring 320 and engages with the cam grooves 3121 in the inner wall of the middle tube 312 (see FIG. 7). As the cam pins 3211 move following the shape of the cam grooves 3121, the second lens group 420 moves from the telephoto end to the wide-angle end or from the wide-angle end to the telephoto end, being guided by the key way 320a.

The middle tube 312 has the cam pins 3124 implanted in its outer wall. The cam pins 3124 are engaged with the cam grooves 3131 formed in the fixed tube 313. The cam grooves 3131 run in such a way as to rotate through a predetermined angle (indicated by symbol k in FIG. 13) during extension from the collapsed state shown in FIG. 9 to the telephoto end shown in FIG. 8. Thus, the middle tube 312 extends along the optical axis following the cam grooves 3131 while rotating by the predetermined angle from the collapsed state (FIG. 9) to the telephoto end (FIG. 8) by receiving the driving force of the zoom motor 3300 (see FIGS. 11 and 12). Along with extension of the middle tube 312, the front tube 311 is extended without rotation, following the shape (indicated by symbol m in FIG. 13) of the cam grooves 3123. With the middle tube 312 extended, if the zoom switch is turned to the wide-angle position, the middle tube 312 rotates at the extended position (indicated by symbol 1 in FIG. 13), causing the second lens group 420 to move to the wide-angle end following the shape (indicated by symbol p in FIG. 13) of the cam grooves 3121. In this way, the lens barrel is zoomed according to operation of the zoom switch.

The lens group holding frame 421 which holds the second lens group 420 is supported under the force of a spring by a lens group supporting frame 422. The lens group holding frame 421 has a through-hole 422c to accept the lens group supporting frame 422. A pivot shaft 422a is passed through the through-hole 422c and a spring 422b is wound around a base end of the pivot shaft 422a. The spring 422b is intended to advance the second lens group accurately onto the optical axis as well as to urge the second lens group 420 forward along the optical axis. Thanks to the presence of the spring 422b, the second lens group 420 is urged forward along the optical axis during extension while during collapse, the second lens group holding frame 421 is pressed by a projection 311a on the front tube 311, compressing the spring 422b, and thereby causing the second lens group 420 to be moved to the base end and housed in the lens barrel compactly (see FIG. 9).

The lens group holding frame 421 has a second gear 4211 installed on its outer periphery. The second gear 4211 meshes with a first gear 3204 described later. The first gear 3204 is rotatably supported by the straight-ahead key ring 320 and rotates being driven by rotation of the middle tube 312. The second gear 4211 receives driving force from the first gear 3204. It retracts the second lens group 420 to a predetermined retracted position off the optical axis of the zoom lens during collapse and advances the second lens group 420 onto the optical axis during extension. During extension, the first gear 3204 and second gear 4211 unmesh, causing the second lens group 420 to advance onto the optical axis under the force of the spring 422b. For accurate positioning of the second lens group 420, a stub 4212 is provided on the second lens group holding frame 421 and the second lens group 420 is positioned as the stub 4212 hits a stop bar 4221 provided on the lens group supporting frame 422.

The second gear 4211 lacks teeth in that part 4211a (see FIG. 14) which faces the first gear 3204 when the second lens group 420 is at the retracted position during collapse. The second gear 4211 unmeshes from the first gear 3204 in at least part of a zoom range by being extended ahead of the first gear 3204, and the first gear 3204 lacks teeth in that part 3204a (see FIG. 14) which faces the second gear 4211 reaching a meshing position from ahead in the process of zooming or in the process of collapse.

If part of the first gear 3204 and part of the second gear 4211 are removed in advance as shown in FIG. 14, the two gears mesh with each other smoothly without interfering with each other when the unmeshed gears reach a meshing position where they mesh or when the second lens group 420 reaches a predetermined retracted position. The first gear 3204 lacks teeth in that part which would mesh with the second gear moving with the lens group holding frame 421 and the second gear 4211 lacks teeth in that part 4211a which corresponds to the retraction position of the second lens group 420. Thus, the second gear 4211 lacks teeth in that part which faces the first gear 3204 during collapse while the first gear 3204 lacks teeth in that part which faces the second gear 4211 reaching the meshing position from ahead in the process of zooming or in the process of collapse.

The third lens group 430 is supported by the straight-ahead key ring 320, which also supports the fourth lens group via a travel mechanism consisting of a focus motor 3200 and a column screw meshing with a gear head of the focus motor 3200. The fourth lens group 440 is supported by the lens group holding frame 441. A through-hole 441a is made in the lens group holding frame 441 and a guide rod 3202 attached to the straight-ahead key ring 320 is passed through the through-hole 441a. The column screw 3201 is screwed into a nut 3201a, which is engaged with the lens group holding frame 441. On the other hand, a spring 441b is wound around the guide rod 3202 of the lens group holding frame 441 and urges the lens group holding frame 441 toward the base end of the guide rod 3202.

As described above, the focus motor 3200 which moves the fourth lens group 440 along the optical axis is also supported by the straight-ahead key ring 320. The rotational driving force of the focus motor 3200 supported by the straight-ahead key ring 320 is transmitted via a gear train to rotate the column screw 3201 shown in FIG. 8. The nut 3201a fitted rotatably over the column screw 3201 moves by the distance equivalent to the rotation of the column screw 3201, the fourth lens group holding frame 441 is held at the place to which the nut 3201a moves, and consequently focus is adjusted.

As is the case with the second lens group 420, the fourth lens group holding frame 441 which holds the fourth lens group 440 has a gear 4411, which meshes with the first gear 3204 during collapse, as is the case with the second gear 4211, to retract the fourth lens group 440 to a retracted position (see FIG. 12). As is the case with the second gear 4211 shown in FIG. 12, the gear 4411 lacks teeth in that part 4411a which faces the first gear 3204 when the fourth lens group 440 is at the retracted position during collapse.

To take a photograph with a photographic apparatus which incorporates a lens barrel with such a configuration, a control device (not shown) gives a drive command for focus adjustment to the focus motor 3200 supported by the straight-ahead key ring, based on image data generated by an image pickup device 500.

After the focus adjustment, when a shutter button 304 is pressed, a shutter unit 330 supported by the straight-ahead key ring is operated and an electronic shutter is operated to take a photograph. Consequently, light from the subject passes through the first lens group 410, second lens group 420, third lens group 430, and fourth lens group (focus lens) 440 and forms an image on a light-receiving surface of the image pickup device 500, which generates an image signal which represents the subject image formed on the light-receiving surface. Incidentally, wiring cables for use to transmit commands to the focus motor and shutter unit are not shown in FIG. 7 to 11.

In this way, the straight-ahead key ring 320 which moves along the optical axis supports the second lens group 420 and third lens group 430. Also, it supports the fourth lens group 440 via the column screw 3201. Furthermore, it supports the focus motor 3200 which rotates the column screw 3201. In this configuration, the fourth lens group is moved together with the straight-ahead key ring to near the focus position and the position of the fourth lens group is fine-adjusted for focus adjustment by turning the column screw. This eliminates the need to install a long column screw running along the optical axis from the light-receiving surface of the image pickup device and move the fourth lens group a long way by turning the column screw. This creates a free space between the image pickup device 500 and fourth lens group 440. During collapse, the lens groups retracted from the optical axis to the retracted position can be housed in this free space, reducing the length of the lens barrel greatly. Consequently, even though the digital camera 300 shown in FIGS. 5 and 6 has a slim body, the lens barrel 310 is housed in the camera body when it is collapsed and the digital camera 300 allows photography with a high zoom ratio when the lens barrel 310 holding the four-group zoom lens is extended from the camera body.

Incidentally, although in this embodiment, the second lens group and fourth lens group are retracted to the retracted position as the first lens group according to the present invention, it is also possible to retract only the second lens group or fourth lens group. Furthermore, the predetermined first lens group according to the present invention may be the third lens group, first lens group, or any other lens group in this embodiment.

Finally, an internal configuration of the digital camera in FIGS. 5 and 6 is described.

Figure 15:
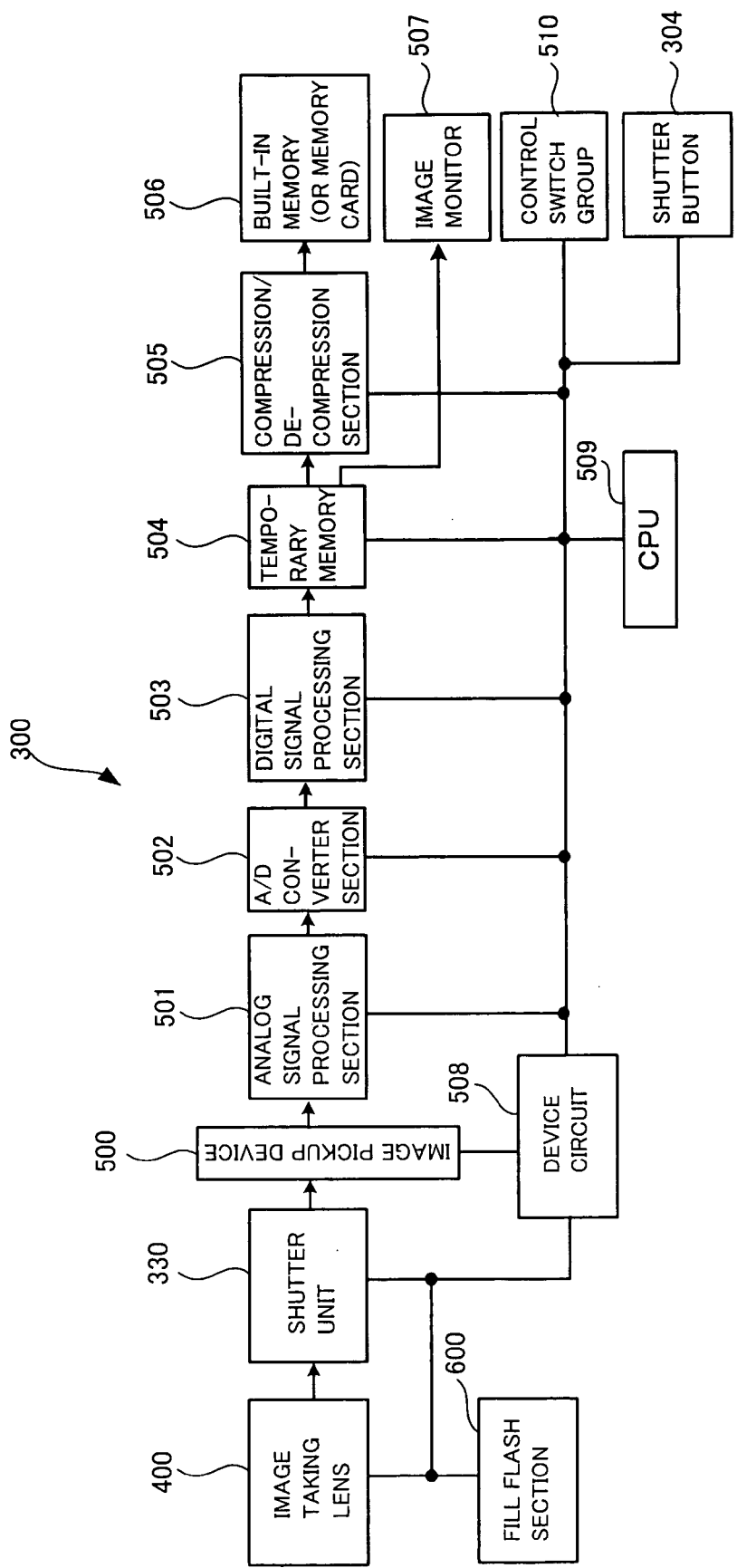
FIG. 15 is a block diagram showing a circuit configuration of the digital camera according to this embodiment.

FIG. 15 is a block diagram showing a circuit configuration of the digital camera according to this embodiment.

The digital camera 300 shown in FIG. 15 is equipped with a four-group zoom lens 400 composed of the first lens group 410, second lens group 420, third lens group 430, and fourth lens group 440 shown in FIGS. 7 to 9 as well as with the shutter unit 330 and image pickup device 500. A subject image formed on the image pickup device 500 via the zoom lens 400 and shutter unit 330 is converted into an analog image signal by the image pickup device 500. The shutter unit 330 is composed of an aperture which controls amounts of light falling on the image pickup device and a shutter which prevents smearing caused by light when the analog signal is read from the image pickup device 500.

The digital camera 300 is equipped with a fill flash section 600, which emits fill light ahead of the digital camera through the fill flash window 302 shown in FIGS. 5 and 6 in low-light conditions. The fill flash section 600 can be made to emit light other than in low-light conditions if necessary.

Also, the digital camera 300 is equipped with an analog signal processing section 501, A/D converter section 502, digital signal processing section 503, temporary memory 504, compression/decompression section 505, built-in memory (or memory card) 506, image monitor 507, and a drive circuit 508. The image pickup device 500 is driven based on timings generated by a timing generation circuit (not shown) in the drive circuit 508 and outputs an analog image signal. Also, the drive circuit 508 includes drive circuits which drive the image taking lens 400, shutter unit, fill flash section 600, etc. The analog image signal outputted from the image pickup device 500 is subjected to analog signal processing by the analog signal processing section 501, to A/D conversion by the A/D converter section 502, and to digital signal processing by the digital signal processing section 503. Image data which represents the image after the digital signal processing is stored temporarily in the temporary memory 504. The image data stored in the temporary memory 504 is compressed by the compression/decompression section 505 and recorded in the built-in memory (or memory card) 506. Depending on image mode, the image data may be stored in the built-in memory (or memory card) 506 directly by omitting the process of compression. The image data stored in the temporary memory 504 is read out to display the image of the subject on the image monitor 507.

Furthermore, the digital camera 300 is equipped with a CPU 509 which controls the entire digital camera 300, control switch group 510 including a zoom control switch, and shutter button 304. A photograph is taken, i.e., image data such as those described above is generated when the user sets desired photographic conditions including a desired angle of view by operating the control switch group 510 and presses the shutter button 304.

In the above embodiments, there is described an example in which the zoom lens composed of four lens groups is used and the second and the fourth lens groups are retracted. However, lens groups other than the second and fourth lens groups may be retracted. Also, the lens is not limited to the structure consisting of four lens groups and can be composed of two lens groups, three lens groups, or five or more lens groups.

In addition, since the above embodiments are described using a digital camera, the words "collapse" and "extend" are used to describe its lens barrel. However, the present invention is not limited to photographic apparatus such as digital camera and can be widely applied to optical apparatus having a lens consisting of multiple lens groups.

Since the present invention can be applied to optical apparatus having a lens unit consisting of multiple lens groups, such optical apparatus is described below as an example.

Figure 16:
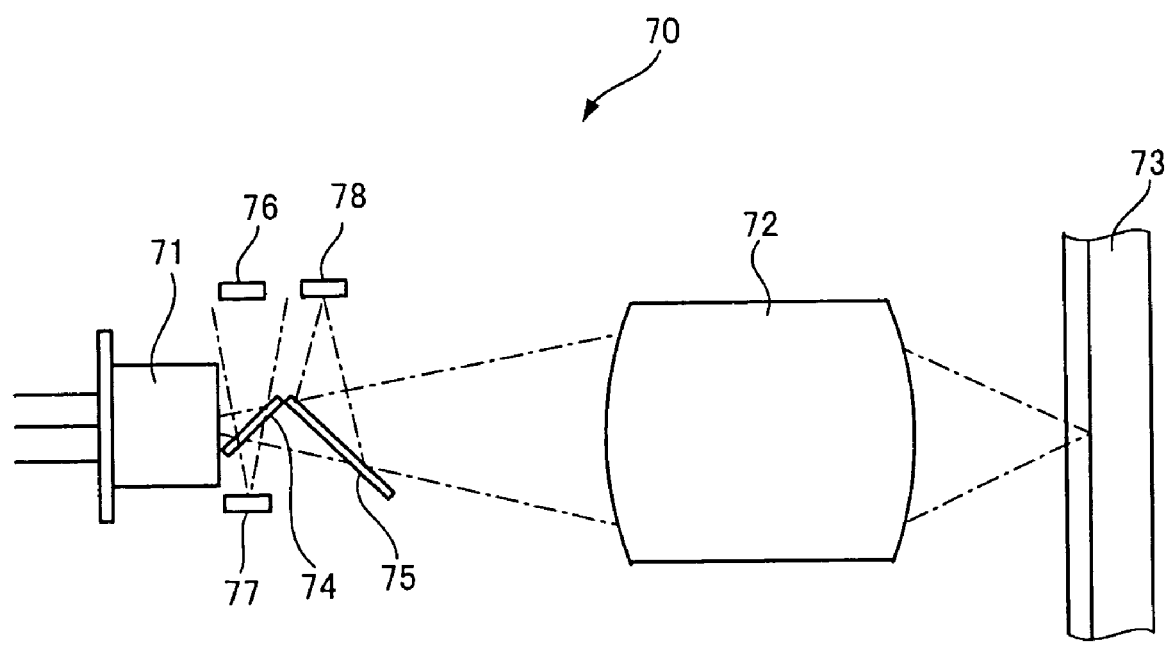
FIG. 16 is a diagram showing the configuration of an optical pickup apparatus as an example of the optical apparatus.

FIG. 16 is a diagram showing the configuration of an optical pickup apparatus as an example of the optical apparatus.

An optical pickup apparatus 70 shown in FIG. 16 is comprised of a semiconductor laser 71 and an optical system for guiding light emitted from the semiconductor laser 71 onto an optical disk 73. The optical system includes a lens unit 72 that is comprised of a lens consisting of the first lens group, the second lens group, the third lens group and the fourth lens group arranged in this order when viewed from ahead along the optical axis. The lens unit 72 has a tube extendable between the first state in which the tube length is relatively short and the second state in which the tube length is relatively long. The optical pickup apparatus 70 includes a lens advancing/retracting mechanism that retracts at least one of the multiple lens groups from the optical axis when the lens unit switches from the second state to the first state and advances the retracted lens group onto the optical axis when the lens unit shifts from the first state to the second state.

A brief description of the operation performed by the optical pickup apparatus 70 shown in FIG. 16 is given below.

The optical pickup apparatus 70 focuses the light emitted from the semiconductor laser 71 on the optical disk 73 by using the optical system including the lens unit so as to record an image signal on the optical disk 73. In the optical pickup apparatus 70 shown in FIG. 16, part of the light emitted from the semiconductor laser 71 is reflected by a glass plate 74 arranged obliquely with respect to the light axis and detected by a light detector 76 so that a detection signal is generated. The detection signal is then sent back to a driving device (not shown) of the semiconductor laser so that the output level of the semiconductor laser is adjusted and the intensity of the light to be emitted is controlled. Also, in the optical pickup apparatus 70, light returned from the optical disk 73 is reflected by glass plates 74 and 75 and detected by light detectors 77 and 78 respectively so that a focus error signal and a tracking error signal are generated.

If the above lens unit is incorporated into such an optical apparatus, it is housed in the optical apparatus when unused to make the optical apparatus compact in size.

Figure 17:
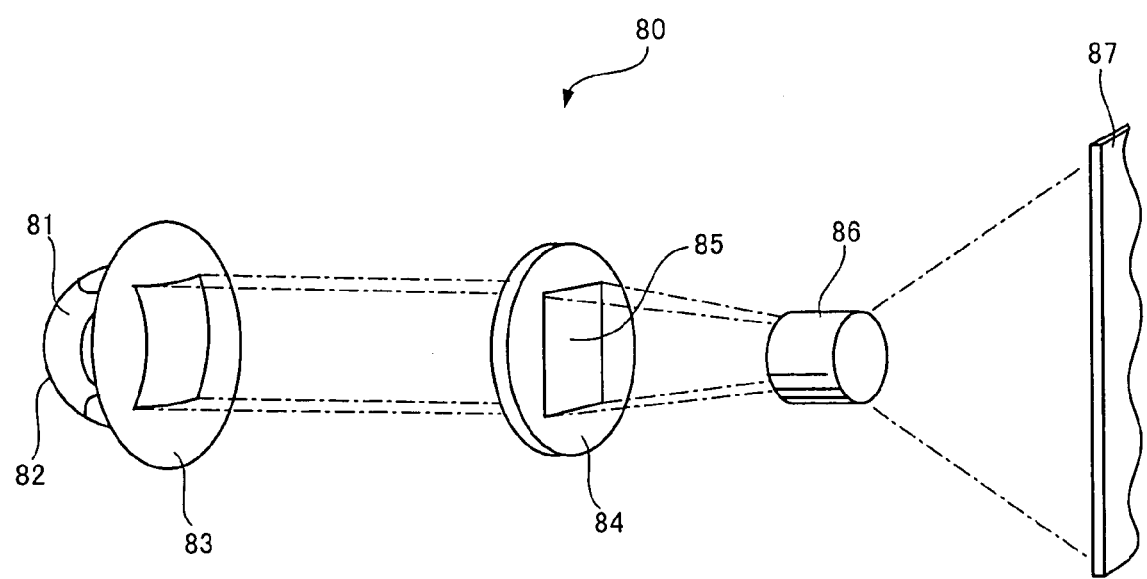
FIG. 17 is a diagram showing a liquid crystal projector 80 as another example of the optical apparatus.

FIG. 17 shows a liquid crystal projector 80 as another example of the optical apparatus.

As shown in FIG. 17, the liquid crystal projector 80 includes: a lamp 81; an oval reflector 82 that reflects white light emitted from the lamp 81 backward in the optical axis so as to make the white light going forward in the optical axis; a circular reflector 83 that has an irradiation hole and reflects light which is not reflected by the oval reflector 82 toward the oval reflector 82; a condensing lens 84 that changes the path of polarized light generated by the oval reflector 82 so as to condense it to a liquid crystal panel 85; the liquid crystal panel 85 that modulates light condensed by the condensing lens 84; and a projecting lens 86 that forms light of R, G and B modulated by the liquid crystal panel 85 on a screen 87. A lens unit of which structure is similar to that of the above-described lens barrel can be applied to the projecting lens 86. Then, as an optical apparatus, there is realized a liquid crystal projector having the projecting lens 86 housed therein when unused.

What is claimed is:

1. A lens barrel which is extendable and collapsible and holds a zoom lens consisting of a plurality of lens groups, the lens barrel comprising:

a rotating tube which rotates by a driving force and extends and collapses the zoom lens;

a first gear which meshes with a gear formed in an inner surface of the rotating tube and which rotates, being driven by the rotation of the rotating tube; and a second gear which, being driven by the first gear with which the second gear meshes, retracts a predetermined first lens group among the plurality of lens groups to a predetermined retracted position off the optical axis of the zoom lens during collapse and advances the predetermined first lens group onto the optical axis during extension, wherein the second gear lacks teeth in that part which faces the first gear when the first lens group is at the retracted position during collapse.

2. The lens barrel according to claim 1, wherein:

the zoom lens consists of four lens groups; and the first gear retracts a second lens group to a predetermined retracted position off the optical axis of the zoom lens during collapse and advances the second lens group onto the optical axis during extension.

3. The lens barrel according to claim 1, wherein:

the zoom lens consists of four lens groups; and the first gear retracts a fourth lens group to a predetermined retracted position off the optical axis of the zoom lens during collapse and advances the fourth lens group onto the optical axis during extension.

4. A lens barrel which is extendable and collapsible and holds a zoom lens consisting of a plurality of lens groups, the lens barrel comprising:

a rotating tube which rotates by a driving force and extends and collapses the zoom lens;

a first gear which rotates, being driven by the rotation of the rotating tube; and a second gear which, being driven by the first gear with which the second gear meshes, retracts a predetermined first lens group among the plurality of lens groups to a predetermined retracted position off the optical axis of the zoom lens during collapse and advances the predetermined first lens group onto the optical axis during extension, wherein the second gear lacks teeth in that part which faces the first gear when the first lens group is at the retracted position during collapse, and wherein:

the second gear unmeshes from the first gear in at least part of a zoom range by being extended ahead of the first gear; and the first gear lacks teeth in that part which faces the second gear reaching a meshing position from ahead in the process of zooming or in the process of collapse.

5. A lens barrel which is extendable and collapsible and holds a zoom lens consisting of a plurality of lens groups, the lens barrel comprising:

a rotating tube which rotates by a driving force and extends and collapses the zoom lens;

a first gear which rotates, being driven by the rotation of the rotating tube; and a second gear which, being driven by the first gear with which the second gear meshes, retracts a predetermined first lens group among the plurality of lens groups to a predetermined retracted position off the optical axis of the zoom lens during collapse and advances the predetermined first lens group onto the optical axis during extension, wherein the second gear lacks teeth in that part which faces the first gear when the first lens group is at the retracted position during collapse, said lens barrel further comprising a fixed tube and a straight-ahead key member advanceably/retractably engaged with the fixed tube;

wherein:

the rotating tube is a middle tube which rotatably engages with the straight-ahead key member and advances/retracts along with rotation due to cam engagement with the fixed tube, the lens barrel further comprises a front tube which advanceably/retractably engages with the straight-ahead key member and advances/retracts along with rotation due to cam engagement with the middle tube, and the first gear is rotatably supported by the straight-ahead key member and rotates being driven by rotation of the middle tube.

6. A photographic apparatus which takes photographs by capturing light from a subject entering through a zoom lens consisting of a plurality of lens groups and held by an extendable/collapsible lens barrel, wherein:

the lens barrel comprises:

a rotating tube which rotates by a driving force and extends and collapses the zoom lens, a first gear which meshes with a gear formed in an inner surface of the rotating tube and which rotates, being driven by the rotation of the rotating tube; and a second gear which, being driven by the first gear with which the second gear meshes, retracts a predetermined first lens group among the plurality of lens groups to a predetermined retracted position off the optical axis of the zoom lens during collapse and advances the predetermined first lens group onto the optical axis during extension, and the second gear lacks teeth in that part which faces the first gear when the first lens group is at the retracted position during collapse.

7. The photographic apparatus according to claim 6, comprising an image pickup device which generates image signals by capturing light from a subject entering through the zoom lens held by the lens barrel.

8. A photographic apparatus which takes photographs by capturing light from a subject entering through a zoom lens consisting of a plurality of lens groups and held by an extendable/collapsible lens barrel, wherein:

the lens barrel comprises:

a rotating tube which rotates by a driving force and extends and collapses the zoom lens, a first gear which rotates, being driven by the rotation of the rotating tube, and a second gear which, being driven by the first gear with which the second gear meshes, retracts a predetermined first lens group among the plurality of lens groups to a predetermined retracted position off the optical axis of the zoom lens during collapse and advances the predetermined first lens group onto the optical axis during extension, wherein the second gear lacks teeth in that part which faces the first gear when the first lens group is at the retracted position during collapse, wherein:

the second gear unmeshes from the first gear in at least part of a zoom range by being extended ahead of the first gear; and the first gear lacks teeth in that part which faces the second gear reaching a meshing position from ahead in the process of zooming or in the process of collapse.

9. A lens barrel that holds an image taking lens consisting of a plurality of lens groups and is capable of changing a barrel length thereof between a housed state of relatively short length and a photographing state of relatively long length, the lens barrel comprising:
  a rotating tube which rotates by a driving force so as to change the lens barrel between the photographing state and the housed state;
  a first gear which meshes with a gear formed in an inner surface of the rotating tube and which rotates, being driven by the rotation of the rotating tube; and
  a second gear which, being driven by the first gear with which the second gear meshes, retracts a predetermined first lens group among the plurality of lens groups to a predetermined retracted position off the optical axis of the image taking lens during transition to the housed state and advances the predetermined first lens group onto the optical axis during extension, wherein:
  the second gear lacks teeth in that part which faces the first gear when the first lens group retracted during transition to the housed state is at the retracted position.

10. The lens barrel according to claim 9, wherein:
  the image taking lens consists of four lens groups; and
  the first gear retracts a second lens group to a predetermined retracted position off the optical axis of the image taking lens during transition to the housed state and advances the second lens group onto the optical axis during transition to the photographing state.

11. The lens barrel according to claim 9, wherein:
  the image taking lens consists of four lens groups; and
  the first gear retracts a fourth lens group to a predetermined retracted position off the optical axis of the image taking lens during transition to the housed state and advances the fourth lens group onto the optical axis during transition to the photographing state.

12. A lens barrel that holds an image taking lens consisting of a plurality of lens groups and is capable of changing a barrel length thereof between a housed state of relatively short length and a photographing state of relatively long length, the lens barrel comprising:
  a rotating tube which rotates by a driving force so as to change the lens barrel between the photographing state and the housed state;
  a first gear which rotates, being driven by the rotation of the rotating tube; and
  a second gear which, being driven by the first gear with which the second gear meshes, retracts a predetermined first lens group among the plurality of lens groups to a predetermined retracted position off the optical axis of the image taking lens during transition to the housed state and advances the predetermined first lens group onto the optical axis during extension,
  wherein
  second gear lacks teeth in that part which faces the first gear when the first lens group retracted during transition to the housed state is at the retracted position;
  wherein:
  the second gear unmeshes from the first gear in at least part of a zoom range by being extended ahead of the first gear; and
  the first gear lacks teeth in that part which faces the second gear reaching a meshing position from ahead in the process of zooming or in the process of transition to the housed state.

13. A lens barrel that holds an image taking lens consisting of a plurality of lens groups and is capable of changing a barrel length thereof between a housed state of relatively short length and a photographing state of relatively long length, the lens barrel comprising:
  a rotating tube which rotates by a driving force so as to change the lens barrel between the photographing state and the housed state;
  a first gear which rotates, being driven by the rotation of the rotating tube; and
  a second gear which, being driven by the first gear with which the second gear meshes, retracts a predetermined first lens group among the plurality of lens groups to a predetermined retracted position off the optical axis of the image taking lens during transition to the housed state and advances the predetermined first lens group onto the optical axis during extension, wherein:
  the second gear lacks teeth in that part which faces the first gear when the first lens group retracted during to the housed state is at the retracted position;
  said lens barrel further comprising a fixed tube and a straight-ahead key member advanceably/retractably engaged with the fixed tube;
  wherein the rotating tube is a middle tube which rotatably engages with the straight-ahead key member and advances/retracts along with rotation due to cam engagement with the fixed tube,
  the lens barrel further comprises a front tube which advanceably/retractably engages with the straight-ahead key member and advances/retracts along with rotation due to cam engagement with the middle tube, and
  the first gear is rotatably supported by the straight-ahead key member and rotates being driven by rotation of the middle tube.

14. An optical apparatus that holds a lens consisting of a plurality of lens groups and is capable of changing a barrel length thereof between a first state of relatively short length and a second state of relatively long length, wherein:
  the lens barrel comprises:
  a rotating tube which rotates by a driving force so as to change the lens barrel between the first state and the second state,
  a first gear which meshes with a gear formed in an inner surface of the rotating tube and which rotates, being driven by the rotation of the rotating tube; and
  a second gear which, being driven by the first gear with which the second gear meshes, retracts a predetermined first lens group among the plurality of lens groups to a predetermined retracted position off the optical axis of the lens during transition to the first state and advances the predetermined first lens group onto the optical axis during extension,
  wherein:
  the second gear lacks teeth in that part which faces the first gear when the first lens group retracted during transition to the first state is at the retracted position.

15. The optical apparatus according to claim 14, wherein:
  the lens consists of four lens groups; and
  the first gear retracts a second lens group to a predetermined retracted position off the optical axis of the lens during transition to the first state and advances the second lens group onto the optical axis during transition to the second state.

16. The optical apparatus according to claim 14, wherein:
  the lens consists of four lens groups; and
  the first gear retracts a fourth lens group to a predetermined retracted position off the optical axis of the lens during transition to the first state and advances the fourth lens group onto the optical axis during transition to the second state.

17. An optical apparatus that holds a lens consisting of a plurality of lens groups and is capable of changing a barrel length thereof between a first state of relatively short length and a second state of relatively long length, wherein:
the lens barrel comprises:
a rotating tube which rotates by a driving force so as to change the lens barrel between the first state and the second state.
a first gear which rotates, being driven by the rotation of the rotating tube, and
a second gear which, being driven by the first gear with which the second gear meshes, retracts a predetermined first lens group among the plurality of lens groups to a predetermined retracted position off the optical axis of the lens during transition to the first state and advances the predetermined first lens group onto the optical axis during extension, and
the second gear lacks teeth in that part which faces the first gear when the first lens group retracted during transition to the first state is at the retracted position, wherein:
the second gear unmeshes from the first gear in at least part of a zoom range by being extended ahead of the first gear; and
the first gear lacks teeth in that part which faces the second gear reaching a meshing position from ahead in the process of zooming or in the process of transition to the first state.

18. An optical apparatus that holds a lens consisting of a plurality of lens groups and is capable of changing a barrel length thereof between a first state of relatively short and a second state of relatively long length, wherein:
the lens barrel comprises:
a rotating tube which rotates by a driving force so as to change the lens barrel between state and the second state,
a first gear which rotates, being by the rotation of the rotating tube, and
a second gear which, being driven by the first gear with which the second gear meshes, retracts a predetermined first lens group among the plurality of lens groups to a predetermined retracted position off the optical axis of the lens during transition to the first state and advances the predetermined first lens group onto the optical axis during extension, wherein:
the second gear lacks teeth in that part which faces the first gear when the first lens group retracted during transition to the first state is at the retracted position;
said apparatus further comprising:
a fixed tube and a straight-ahead key member advanceably/retractably engaged with the fixed tube;
wherein the rotating tube is a middle tube which rotatably engages with the straight-ahead key member and advances/retracts along with rotation due to cam engagement with the fixed tube,
the lens barrel further comprises a front tube which advanceably/retractably engages with the straight-ahead key member and advances/retracts along with rotation due to cam engagement with the middle tube, and
the first gear is rotatably supported by the straight-ahead key member and rotates being driven by rotation of the middle tube.

* * * * *